US008691175B2

(12) United States Patent
Kendall et al.

(10) Patent No.: US 8,691,175 B2
(45) Date of Patent: Apr. 8, 2014

(54) CALCIUM SULFATE AND CO$_2$ SEQUESTRATION

(75) Inventors: Teavor Kendall, Menlo Park, CA (US); William Bourcier, Livermore, CA (US); Peng Lu, Bloomington, IN (US); Geoffrey Garrison, Seattle, WA (US)

(73) Assignee: Calera Corporation, Los Gatos, CA (US)

( * ) Notice: Subject to any disclaimer, the term of this patent is extended or adjusted under 35 U.S.C. 154(b) by 57 days.

(21) Appl. No.: 13/566,213

(22) Filed: Aug. 3, 2012

(65) Prior Publication Data
US 2013/0195747 A1 Aug. 1, 2013

Related U.S. Application Data

(63) Continuation-in-part of application No. 13/457,156, filed on Apr. 26, 2012.

(60) Provisional application No. 61/480,018, filed on Apr. 28, 2011, provisional application No. 61/526,751, filed on Aug. 24, 2011, provisional application No. 61/534,972, filed on Sep. 15, 2011, provisional application No. 61/514,879, filed on Aug. 3, 2011.

(51) Int. Cl.
| C01F 5/24 | (2006.01) |
|---|---|
| C01F 11/18 | (2006.01) |
| C01G 21/14 | (2006.01) |
| B01D 53/48 | (2006.01) |
| B01D 53/56 | (2006.01) |
| C01B 17/16 | (2006.01) |
| C01B 31/20 | (2006.01) |
| C04B 7/00 | (2006.01) |
| C04B 7/34 | (2006.01) |
| C04B 28/00 | (2006.01) |
| C04B 32/00 | (2006.01) |
| C04B 14/48 | (2006.01) |
| C04B 16/00 | (2006.01) |
| C04B 22/04 | (2006.01) |
| C09C 1/02 | (2006.01) |
| C04B 14/00 | (2006.01) |
| C04B 9/00 | (2006.01) |
| C04B 28/30 | (2006.01) |

(52) U.S. Cl.
USPC ........... 423/430; 423/224; 423/232; 106/738; 106/817; 106/463; 106/801; 106/638; 106/640

(58) Field of Classification Search
USPC ......... 106/706, 738, 709, 714, 718, 817, 656, 106/815, 801, 717, 640, 705, 638; 423/430, 423/224, 232
See application file for complete search history.

(56) References Cited

U.S. PATENT DOCUMENTS

| 5,049,198 A | 9/1991 | Ribas |
| 6,264,740 B1 | 7/2001 | McNulty, Jr. |

(Continued)

FOREIGN PATENT DOCUMENTS

| EP | 2253600 A1 | 11/2010 |
| WO | WO 2008/018928 A2 | 2/2008 |

(Continued)

OTHER PUBLICATIONS

Berner, R. A. "The role of magnesium in the crystal growth of calcite and aragonite from sea water" Geochimica et Cosmochimica Acta (1975) vol. 39, pp. 489-504.

(Continued)

Primary Examiner — Kaj K Olsen
Assistant Examiner — Karam Hijji
(74) Attorney, Agent, or Firm — Calera Corporation

(57) ABSTRACT

Systems, methods, and compositions are provided related to utilizing gypsum for CO$_2$ sequestration to form solid products containing calcium carbonate.

16 Claims, 7 Drawing Sheets

(56) References Cited

U.S. PATENT DOCUMENTS

| | | | |
|---|---|---|---|
| 7,735,274 | B2 | 6/2010 | Constantz et al. |
| 7,744,761 | B2 | 6/2010 | Constantz et al. |
| 7,749,476 | B2 | 7/2010 | Constantz et al. |
| 7,753,618 | B2 | 7/2010 | Constantz et al. |
| 7,754,169 | B2 | 7/2010 | Constantz et al. |
| 7,771,684 | B2 | 8/2010 | Constantz et al. |
| 7,790,012 | B2 | 9/2010 | Kirk et al. |
| 7,815,880 | B2 | 10/2010 | Constantz et al. |
| 7,829,053 | B2 | 11/2010 | Constantz et al. |
| 7,875,163 | B2 | 1/2011 | Gilliam et al. |
| 7,887,694 | B2 | 2/2011 | Constantz et al. |
| 7,906,028 | B2 | 3/2011 | Constantz et al. |
| 7,914,685 | B2 | 3/2011 | Constantz et al. |
| 7,922,809 | B1 | 4/2011 | Constantz et al. |
| 7,931,809 | B2 | 4/2011 | Constantz et al. |
| 7,939,336 | B2 | 5/2011 | Constantz et al. |
| 7,966,250 | B2 | 6/2011 | Constantz et al. |
| 7,993,500 | B2 | 8/2011 | Gilliam et al. |
| 7,993,511 | B2 | 8/2011 | Gilliam et al. |
| 8,006,446 | B2 | 8/2011 | Constantz et al. |
| 8,062,418 | B2 | 11/2011 | Constantz et al. |
| 8,114,214 | B2 | 2/2012 | Constantz et al. |
| 8,137,444 | B2 | 3/2012 | Farsad et al. |
| 2009/0202410 | A1 | 8/2009 | Kawatra et al. |
| 2010/0051859 | A1 | 3/2010 | House et al. |
| 2010/0084280 | A1 | 4/2010 | Gilliam et al. |
| 2010/0132556 | A1 | 6/2010 | Constantz et al. |
| 2010/0135865 | A1 | 6/2010 | Constantz et al. |
| 2010/0135882 | A1 | 6/2010 | Constantz et al. |
| 2010/0144521 | A1 | 6/2010 | Constantz et al. |
| 2010/0150802 | A1 | 6/2010 | Gilliam et al. |
| 2010/0154679 | A1 | 6/2010 | Constantz et al. |
| 2010/0196104 | A1 | 8/2010 | Constantz et al. |
| 2010/0200419 | A1 | 8/2010 | Gilliam et al. |
| 2010/0219373 | A1 | 9/2010 | Seeker et al. |
| 2010/0224503 | A1 | 9/2010 | Kirk et al. |
| 2010/0229725 | A1 | 9/2010 | Farsad et al. |
| 2010/0230293 | A1 | 9/2010 | Gilliam et al. |
| 2010/0230830 | A1 | 9/2010 | Farsad et al. |
| 2010/0236242 | A1 | 9/2010 | Farsad et al. |
| 2010/0239467 | A1 | 9/2010 | Constantz et al. |
| 2010/0239487 | A1 | 9/2010 | Constantz et al. |
| 2010/0258035 | A1 | 10/2010 | Constantz et al. |
| 2010/0258506 | A1 | 10/2010 | Berkowitz et al. |
| 2010/0276299 | A1 | 11/2010 | Kelly et al. |
| 2010/0290967 | A1 | 11/2010 | Detournay et al. |
| 2010/0313793 | A1 | 12/2010 | Constantz et al. |
| 2010/0313794 | A1 | 12/2010 | Constantz et al. |
| 2010/0319586 | A1 | 12/2010 | Blount et al. |
| 2011/0030586 | A1 | 2/2011 | Constantz et al. |
| 2011/0030957 | A1 | 2/2011 | Constantz et al. |
| 2011/0033239 | A1 | 2/2011 | Constantz et al. |
| 2011/0035154 | A1 | 2/2011 | Kendall et al. |
| 2011/0036728 | A1 | 2/2011 | Farsad et al. |
| 2011/0042230 | A1 | 2/2011 | Gilliam et al. |
| 2011/0054084 | A1 | 3/2011 | Constantz et al. |
| 2011/0059000 | A1 | 3/2011 | Constantz et al. |
| 2011/0071309 | A1 | 3/2011 | Constantz et al. |
| 2011/0079515 | A1 | 4/2011 | Gilliam et al. |
| 2011/0083968 | A1 | 4/2011 | Gilliam et al. |
| 2011/0091366 | A1 | 4/2011 | Kendall et al. |
| 2011/0091955 | A1 | 4/2011 | Constantz et al. |
| 2011/0132234 | A1 | 6/2011 | Constantz et al. |
| 2011/0147227 | A1 | 6/2011 | Gilliam et al. |
| 2011/0203489 | A1 | 8/2011 | Constantz et al. |
| 2011/0226989 | A9 | 9/2011 | Seeker et al. |
| 2011/0240916 | A1 | 10/2011 | Constantz et al. |
| 2011/0247336 | A9 | 10/2011 | Farsad et al. |
| 2011/0277474 | A1 | 11/2011 | Constantz et al. |
| 2011/0277670 | A1 | 11/2011 | Self et al. |
| 2013/0036948 | A1 | 2/2013 | Fernandez et al. |

FOREIGN PATENT DOCUMENTS

| | | | |
|---|---|---|---|
| WO | WO 2008/148055 | A1 | 12/2008 |
| WO | WO 2009/006295 | A2 | 1/2009 |
| WO | WO 2009/086460 | A1 | 7/2009 |
| WO | WO 2009/146436 | A1 | 12/2009 |
| WO | WO 2009/155378 | A1 | 12/2009 |
| WO | WO 2010/006242 | A1 | 1/2010 |
| WO | WO 2010/008896 | A1 | 1/2010 |
| WO | WO 2010/009273 | A1 | 1/2010 |
| WO | WO 2010/030826 | A1 | 3/2010 |
| WO | WO 2010/039903 | A1 | 4/2010 |
| WO | WO 2010/039909 | A1 | 4/2010 |
| WO | WO 2010/048457 | A1 | 4/2010 |
| WO | WO 2010/051458 | A1 | 5/2010 |
| WO | WO 2010/068924 | A1 | 6/2010 |
| WO | WO 2010/074686 | A1 | 7/2010 |
| WO | WO 2010/074687 | A1 | 7/2010 |
| WO | WO 2010/087823 | A1 | 8/2010 |
| WO | WO 2010/091029 | A1 | 8/2010 |
| WO | WO 2010/093713 | A1 | 8/2010 |
| WO | WO 2010/093716 | A1 | 8/2010 |
| WO | WO 2010/101953 | A1 | 9/2010 |
| WO | WO 2010/104989 | A1 | 9/2010 |
| WO | WO 2010/132863 | A1 | 11/2010 |
| WO | WO 2010/136744 | A1 | 12/2010 |
| WO | WO 2011/008223 | A1 | 1/2011 |
| WO | WO 2011/017609 | A1 | 2/2011 |
| WO | WO 2011/038076 | A1 | 3/2011 |
| WO | WO 2011/049996 | A1 | 4/2011 |
| WO | WO 2011/066293 | A1 | 6/2011 |
| WO | WO 2011/075680 | A1 | 6/2011 |
| WO | WO 2011/081681 | A1 | 7/2011 |
| WO | WO 2011/097468 | A2 | 8/2011 |
| WO | WO 2011/102868 | A1 | 8/2011 |

OTHER PUBLICATIONS

Busenberg et al., "Kinetic and thermodynamic factors controlling the distribution of SO2/4 and Na+ in calcites and selected arogonites" Geochimica et Cosmochimica Acta (1985) vol. 49; pp. 713-725.

Constantz, B. (2009) "The Risk of Implementing New Regulations on Game-Changing Technology: Sequestering CO2 in the Built Environment" AGU, 90(22), Jt. Assem, Suppl., Abstract.

De Leeuw et al., "Surface Structure and Morphology of Calcium Carbonate Polymorphs Calcite, Aragonite, and Avaterite: An Atomistic Approach" J. Phys. Chem B (1998) 102, 2914-2922.

Fernandez-Diaz et al. (2009) The Carbonatation of Gypsum: Pathways and Pseudomorph Formation. American Mineralogist. 94: 1223-1234.

Fernandez-Diaz et al."The role of sulfate groups in controlling CaCO3 polymorphism" Geochimica et Cosmochimica Acta (2010) 74: 6064-6076.

Gutjahr et al., "Studies of the growth and dissolution kinetics of the CaCO3 polymorphs calcite and aragonite II. The influence of divalent cation additives on the growth and dissolution rates" Journal of Crystal Growth (1996) 158: 310-315.

Kitamura, M., "Crystallization and Transformation Mechanism of Calcium Carbonate Polymorphs and the Effect of Magnesium Ion" Journal of Colloid and Interface Science (2001) 236, 318-327.

Kitano, Y. "The influence of organic material on the polymorphoc crystallization of calcium carbonate" Geochimica et Cosmochimica Acta (1965) vol. 29 pp. 29-41.

Kralj et al., "Vaterite growth and dissolution in aqueous solution III. Kinetics of transportation" Journal of Crystal Growth (1997) 177: 248-257.

Morse, J.W. "The surface chemistry of calcium carbonate minerals in natural waters: an overview" Marine Chemistry (1986) vol. 20: 91-112.

Park et al., "Effects of magnesium chloride and organic additives on the synthesis of aragonite precipitated calcium carbonate" Journal of Crystal Growth (2008) 310: 2593-2601.

Romero et al. (2011) Hydrogen isotopic signatures of algal biomarkers as a proxy of hydroclimatic variability in Lake Isabel, Mexico. Goldschmidt Conference Abstract. Mineralogical Magazine. <www.minersoc.org>.

(56) References Cited

OTHER PUBLICATIONS

Roncal-Herrero et al. 2011. The role of inorganic additives in evaporitic carbonate precipitation. Goldschmidt Conference Abstract. Mineralogical Magazine. <www.minersoc.org>.

Sawada, K. "The mechanisms of crystallization and transformation of calcium carbonates" Pure & Appl. Chem. (1997) vol. 69, No. 5; pp. 921-928.

Tang et al., "Crystallization of CaCO3, in the presence of sulfate and additives: experimental and molecular dynamics simulations studies" Manuscript; Journal of Colloid and Interface Science (2012);doi 10.1016/j.jcis.2012.02.069.

Xie et al., "The role of Mg2+ and Mg2+/amino acid in controlling polymorph and morphology of calcium carbonate crystal" Materials Chemistry and Physics 101 (2007) 82-92.

Yang et al., "A Computational Study of Mg2+ Dehydration in Aqueous Solution in the Presence of HS' and Other Monovalent Anions—Insights to Dolomite Formation" Manuscript; Geochimica et Cosmochimica Acta (2012) doi: 10.1016/j.gca.2012.03.018; 38 pp.

Combes, et al. Calcium carbonate-calcium phosphate mixed cement compositions for bone reconstruction. J Biomed Mater Res A. Nov. 2006;79(2):318-28.

Combes, et al. Preparation, physical-chemical characterisation and cytocompatibility of calcium carbonate cements. Biomaterials. Mar. 2006;27(9):1945-54. Epub Oct. 10, 2005.

International search report and written opinion dated Feb. 26, 2013 for PCT/US2012/049557.

International search report and written opinion dated Dec. 14, 2012 for PCT/US2012/035232.

Zarga, et al. Study of calcium carbonate and sulfate coprecipitation. Chemical Engineering Science. Jun. 2013; 96(7):33-41.

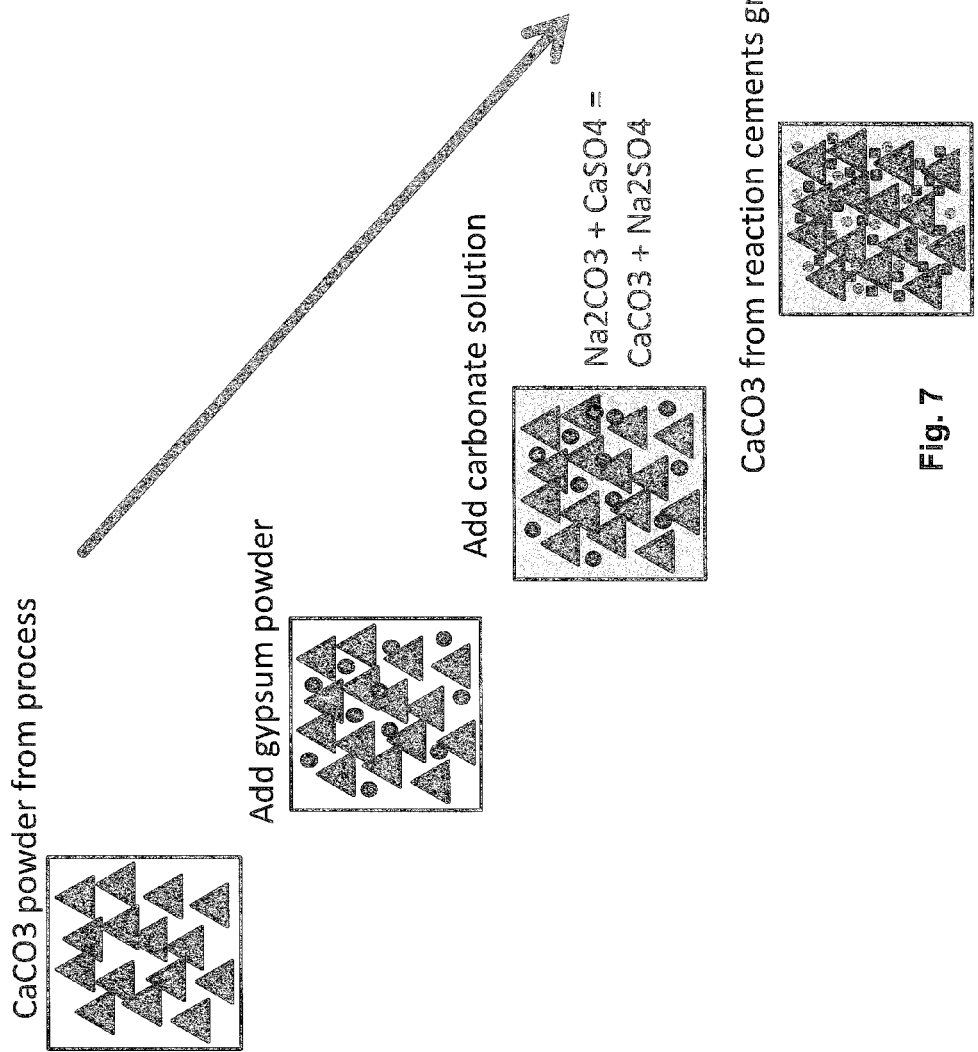

CALCIUM SULFATE AND CO$_2$ SEQUESTRATION

CROSS-REFERENCE TO RELATED APPLICATIONS

This application is a continuation-in-part of U.S. application Ser. No. 13/457,156, filed Apr. 26, 2012 which claims priority to U.S. Provisional Application No. 61/480,018, filed Apr. 28, 2011; U.S. Provisional Application No. 61/526,751, filed Aug. 24, 2011; and U.S. Provisional Application No. 61/534,972, filed Sep. 15, 2011; and this application claims priority to U.S. Provisional Patent Application No. 61/514,879, filed Aug. 3, 2011, all of which are incorporated herein by reference in their entireties in the present disclosure.

BACKGROUND

Carbon dioxide (CO$_2$) emissions have been identified as a major contributor to the phenomenon of global warming CO$_2$ is a by-product of combustion, and creates operational, economic, and environmental problems. It is expected that elevated atmospheric concentrations of CO$_2$ and other greenhouse gases may further facilitate storage of heat within the atmosphere leading to enhanced surface temperatures and rapid climate change. In addition, elevated levels of CO$_2$ in the atmosphere may also further acidify Earth's oceans due to the dissolution of CO$_2$ and formation of carbonic acid. The impact of climate change and ocean acidification may be economically expensive and environmentally hazardous. Reducing potential risks of climate change may require sequestration and avoidance of CO$_2$ from various anthropogenic processes. As such, there is a need for mitigation of carbon dioxide emissions.

SUMMARY

In one aspect, there is provided a method of making a composition, comprising a) contacting an industrial waste gas stream comprising carbon dioxide with an alkaline solution to form a carbon dioxide charged water; and b) contacting the carbon dioxide charged water with calcium sulfate to form a composition comprising a metastable component selected from the group consisting of vaterite, amorphous calcium carbonate, and combination thereof. In some embodiments, the method further comprises removing water, sodium sulfate, or both from the composition. In some embodiments, the contacting of the carbon dioxide charged water with the calcium sulfate is under one or more precipitation conditions that favor the formation of the composition comprising the metastable component selected from the group consisting of vaterite, amorphous calcium carbonate, and combination thereof. In some embodiments, the precipitation conditions favor the formation of more than 50 wt % vaterite or between 50-99 wt % vaterite in the composition. In some embodiments, the method further comprises contacting the composition with water and converting the vaterite to aragonite. In some embodiments, the calcium sulfate is a powder. In some embodiments, the calcium sulfate includes, but not limited to, anhydrous calcium sulfate, calcium sulfate hemihydrate, calcium sulfate dehydrate, and combination thereof. In some embodiments, the method further comprises obtaining the calcium sulfate from mines or quarries, flue gas desulfurization, desalination, recycled building materials, fly ash, basalt, or a combination of sources thereof. In some embodiments, the calcium sulfate comprises particles less than about 150 microns. In some embodiments, the method further comprises forming the composition with $\delta^{13}C$ of less than −12‰. In some embodiments, the composition formed by the methods described above, further comprises sodium sulfate. In some embodiments, the sodium sulfate present in the composition is less than 1 wt % or less than 0.5 wt %. In some embodiments, the method further comprises removing the sodium sulfate from the composition by methods such as, but not limited to, rinsing, filtering, washing, etc. In some embodiments, the method further comprises removing the sodium sulfate from the composition and subjecting the sodium sulfate to electrochemical process to produce sulfuric acid. In some embodiments, the method further comprises combining the composition with water when the composition sets and hardens with a compressive strength of at least 14 MPa after 1 day, 7 days or 28 days. In some embodiments, the composition formed by the methods described above, is a cementitious composition. In some embodiments, the composition formed by the methods described above, is used for making building materials. In some embodiments, the carbon dioxide charged water formed by the methods described above, comprises carbonate, bicarbonate, or combination thereof. In some embodiments, the alkaline solution used in the methods described above, is obtained using an electrochemical method. In some embodiments, the method further comprises obtaining the alkaline solution using an electrochemical method. In some embodiments, the method further comprises mixing the composition with water and pouring the composition in a mold to form a formed building material. In some embodiments, the method further comprises mixing the composition with water to form a building material.

In one aspect, there is provided a composition formed by the methods described above.

In one aspect, there is provided a system to carry out the methods described herein. In some embodiments, there is provided a system comprising a cement producing station operably connected to carbon dioxide from a carbon dioxide source, alkaline solution from an alkali source, and calcium sulfate from a calcium sulfate source and configured to make a composition comprising a metastable component selected from the group consisting of vaterite, amorphous calcium carbonate, and combination thereof. In some embodiments, the system further comprises an alkali source operably connected to the cement producing station configured to electrochemically produce the alkaline solution.

Further provided is a method, comprising: a) preparing a first composition comprising Na$_2$CO$_3$, NaHCO$_3$, or a mixture thereof; b) adding calcium sulfate to the first composition; c) allowing the first composition to react with calcium sulfate to form a second composition comprising CaCO$_3$ and Na$_2$SO$_4$; and d) removing water, Na$_2$SO$_4$, or both water and Na$_2$SO$_4$ from the second composition to produce a third composition, wherein the third composition comprises one or more metastable carbonates selected from the group consisting of amorphous calcium carbonate, vaterite, and aragonite. In some embodiments, the third composition further comprises calcite. In some embodiments, the calcium sulfate is a powder. In some embodiments, the calcium sulfate comprises particles less than about 150 microns in the longest dimension. In some embodiments, the powder is prepared by grinding. In some embodiments, the calcium sulfate comprises an aqueous composition comprising calcium sulfate. In some embodiments, the aqueous composition further comprises chelating agents for dissolution of calcium sulfate. In some embodiments, the calcium sulfate is selected from the group consisting of anhydrous calcium sulfate, calcium sulfate hemihydrate, and calcium sulfate dihydrate. In some embodiments, the calcium sulfate is obtained from mines or quarries, flue gas desulfurization, desalination, recycled building materials, fly ash, basalt, or a combination of sources thereof. In some embodiments, the first composition is a solid composition. In some embodiments, the first composition is an aqueous composition. In some embodiments, the aqueous composition is directly obtained from an electrochemical process. In some embodiments, the electrochemical process is a low-voltage electrochemical process. In some embodiments, the electrochemical process comprises applying a voltage of 2.0 V or less across an anode and a cathode of an electrochemical cell. In some embodiments, the electrochemical process does not produce a gas at the anode of the electrochemical cell. In some embodiments, the first composition is electrochemically produced from a gaseous waste stream comprising carbon dioxide. In some embodiments, carbon in the first composition has a $\delta^{13}C$ of less than −5‰. In some embodiments, the electrochemical process further produces $H_2SO_4$ from $Na_2SO_4$, optionally $Na_2SO_4$ recovered from step d) of claim 1. In some embodiments, water is removed from the second composition to produce the third composition. In some embodiments, the third composition is a $Na_2SO_4$—$CaCO_3$ composite. In some embodiments, carbon in the third composition has a $\delta^{13}C$ of less than −5‰. In some embodiments, the $Na_2SO_4$—$CaCO_3$ composite provides a compressive strength of at least 1500 after 1 day. In some embodiments, the $Na_2SO_4$—$CaCO_3$ composite provides a compressive strength of at least 2500 after 1 day. In some embodiments, water and $Na_2SO_4$ is removed from the second composition to produce the third composition. In some embodiments, the third composition comprises amorphous calcium carbonate. In some embodiments, the third composition comprises vaterite. In some embodiments, the third composition comprises vaterite. In some embodiments, carbon in the third composition has a $\delta^{13}C$ of less than −5‰.

Also provided is a composition, produced in accordance with any one of the foregoing methods.

Also provided is a composition, comprising $CaCO_3$ and $Na_2SO_4$, wherein the composition is self-cementing, and wherein the composition has a compressive strength of at least 1500 psi at least one day after preparation of the composition. In some embodiments, $CaCO_3$ and $Na_2SO_4$ form a composite. In some embodiments, the composition has a compressive strength of at least 2500 psi at least 1 day after preparation of the composition. In some embodiments, the $CaCO_3$ is a metastable $CaCO_3$. In some embodiments, the metastable $CaCO_3$ comprises amorphous calcium carbonate (ACC), vaterite, aragonite, or a combination thereof. In some embodiments, the composition further comprises calcite. In some embodiments, at least 90% of the $CaCO_3$ present in the composition is vaterite. In some embodiments, the particles of the composition are at least 1 micron in the longest dimension. In some embodiments, the composition further comprises $CaSO_4$. In some embodiments, the composition comprises less than 10% (w/w) $Na_2SO_4$. In some embodiments, the composition comprises less than 10% (w/w) $CaSO_4$.

Also provided is a composition, comprising a concrete mixture comprising a binder and an aggregate, wherein the binder comprises a composition in accordance with the foregoing compositions. In some embodiments, the aggregate comprises an aggregate in accordance with U.S. application Ser. No. 12/475,378, filed May 29, 2009, which application is incorporated herein in its entirety. In some embodiments, the aggregate and the binder are bonded through topotactic growth. In some embodiments, the concrete mixture further comprises silica or fumed silica.

BRIEF DESCRIPTION OF DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

FIG. 7 illustrates a flow diagram for an experiment described in Example 1 herein.

DETAILED DESCRIPTION

Figure 1:
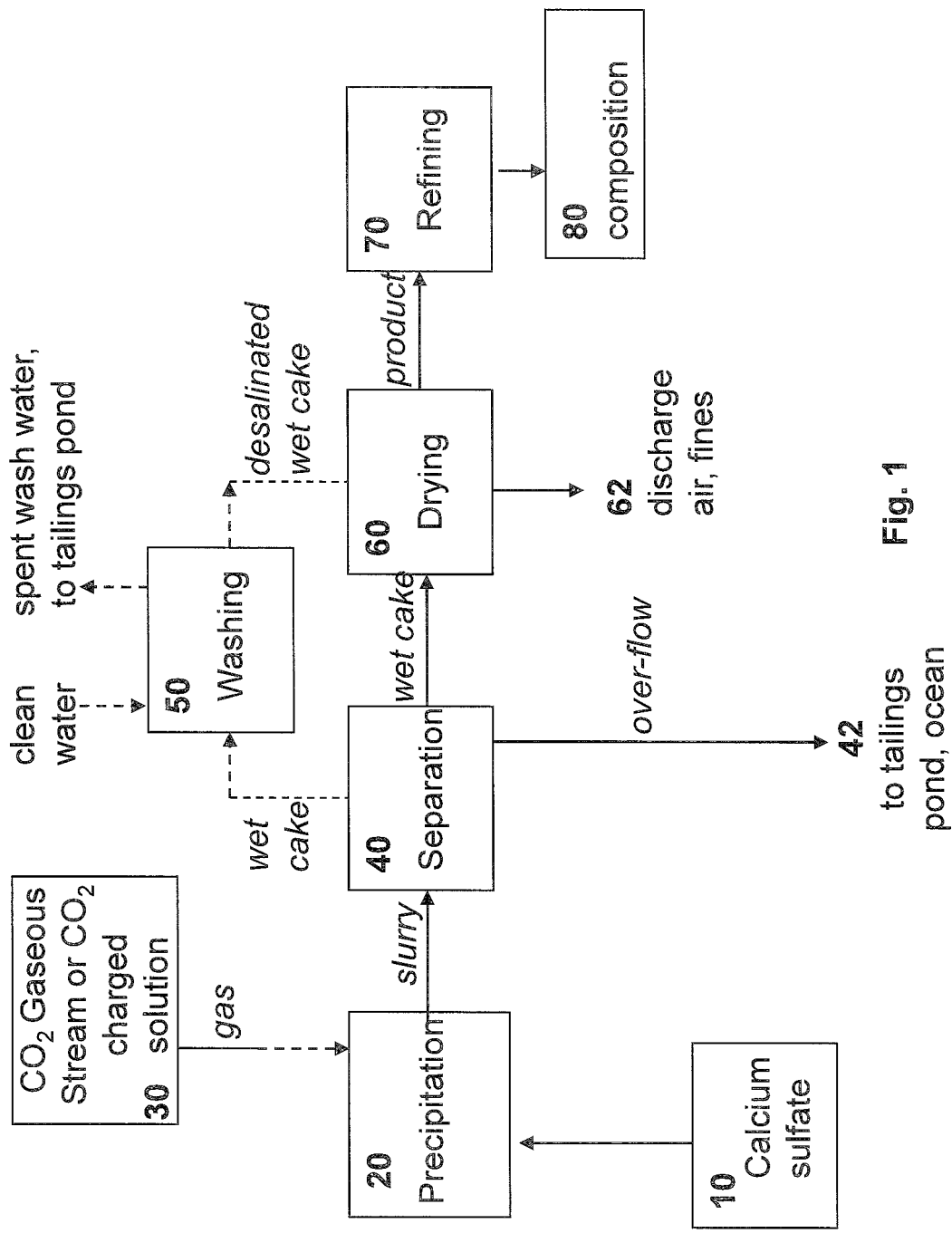
FIG. 1 illustrates a flow diagram for some embodiments of the invention.

Provided herein are compositions, methods and systems for forming a cementitious composition from calcium sulfate (gypsum). In some embodiments, the cementitious composition of the invention formed from gypsum includes a metastable component such as, but not limited to, vaterite, amorphous calcium carbonate, or combination thereof. The cementitious composition may further include stable forms of calcium carbonate such as, but not limited to, aragonite and calcite and optionally magnesium carbonate forms. In some embodiments, the cementitious composition containing metastable form after mixing with water, sets and hardens where vaterite converts to aragonite. The transformation of vaterite to aragonite during and/or after dissolution-re-precipitation process may lead to better compressive strength and binding/linkage. In some embodiments, the cementitious composition formed by the methods of the invention, contains both metastable forms of calcium carbonate and sodium sulfate. Such compositions may also set and harden where vaterite converts to aragonite.

Before the invention is described in greater detail, it is to be understood that the invention is not limited to particular embodiments described herein as such embodiments may vary. It is also to be understood that the terminology used herein is for the purpose of describing particular embodiments only, and is not intended to be limiting, since the scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible. Although any methods and materials similar or equivalent to those described herein may also be used in the practice or testing of the invention, representative illustrative methods and materials are now described.

A. Methods

Provided herein is a method of making a composition, comprising contacting an industrial waste gas stream comprising carbon dioxide with an alkaline solution to form a carbon dioxide charged water; and contacting the carbon dioxide charged water with calcium sulfate to form a composition comprising a metastable component selected from the group consisting of vaterite, amorphous calcium carbonate, or combination thereof. In some embodiments, the above method further includes contacting the carbon dioxide charged water with the calcium sulfate under precipitation conditions that favor the formation of the composition comprising a metastable component selected from the group consisting of vaterite, amorphous calcium carbonate, and combination thereof. In some embodiments, the precipitation conditions favor the formation of more than 50 wt % vaterite or between 50-99 wt % vaterite in the composition. Some examples of such precipitation conditions have been described herein.

An illustration of the process to make the composition is depicted in FIG. 1. In some embodiments, an absorbing solution, e.g., an alkaline solution is charged with $CO_2$ to produce $CO_2$ charged solution 30, which $CO_2$ charged solution is then subjected to carbonate compound precipitation conditions at step 20. In some embodiments, the calcium sulfate powder or calcium sulfate solution 10 is contacted with the $CO_2$ charged solution containing bicarbonate/carbonate ions, which solution is then subjected to carbonate compound precipitation conditions to form the calcium carbonate composition. As illustrated in FIG. 1, a $CO_2$ gaseous stream 30 may also be contacted with the calcium sulfate powder or calcium sulfate solution at precipitation step 20. The "$CO_2$ charged water" or "$CO_2$ charged solution" includes water that has had $CO_2$ gas contacted with it to produce, e.g., carbonic acid, bicarbonate and/or carbonate ion.

Below are provided various components that may be used in making the compositions of the invention.

Calcium Sulfate

Calcium sulfate source may include, but is not limited to, mines or quarries, flue gas desulfurization, desalination (e.g., scaling), recycled building materials, fly ash (e.g., by acid digestion of fly ash with HCl, $H_2SO_4$, etc.), basalt (e.g., by acid digestion of basalt with HCl, $H_2SO_4$, etc.), or a combination of such sources. The "divalent cation" and "alkaline earth metal ion" are used interchangeably herein and refer to calcium sulfate optionally containing magnesium ions.

Flue gas desulfurization (FGD) removes harmful acid gases, such as SOx, from fossil fuel combustion output. Sulfur oxides (SOx) may refer to any of lower sulfur oxides such as SO, $S_2O_2$, $S_2O$, $S_3O$, $S_xO$ (where x is 5-10), $S_6O_2$, $S_7O_2$, and polymeric sulfuroxides; sulfur monoxide (SO); sulfur dioxide ($SO_2$); sulfur trioxide ($SO_3$); and higher sulfur oxides such as $SO_{3+y}$ (where $0<y\leq 1$), or a combination thereof. The combustion of coal, oil, natural gas, or any other sulfur-containing fuels may produce a flue gas in which 98-99% of the sulfur is in the form of sulfur dioxide ($SO_2$) and 1-2% is sulfur trioxide ($SO_3$). For low and high sulfur coals the total concentration of SOx may be in the range of 1,000-4,000 ppm. The desulfurization technologies include, but are not limited to, wet scrubbing, spray-dry scrubbing, wet sulfuric acid process (WSA), and dry sorbent injection systems. In some embodiments, forced oxidation may be used to oxidize sulfur compounds in the waste gas stream or in solution (e.g., sulfites to sulfates) to produce sulfates. For example, in some embodiments, $SO_2$ may be absorbed in a solution as sulfite, which, in turn, may be converted to sulfate by oxidation through aeration. In some embodiments, $SO_2$ may be converted to sulfite upon contact with a solution, which sulfite may be oxidized under conditions already existing in the solution.

Figure 2:
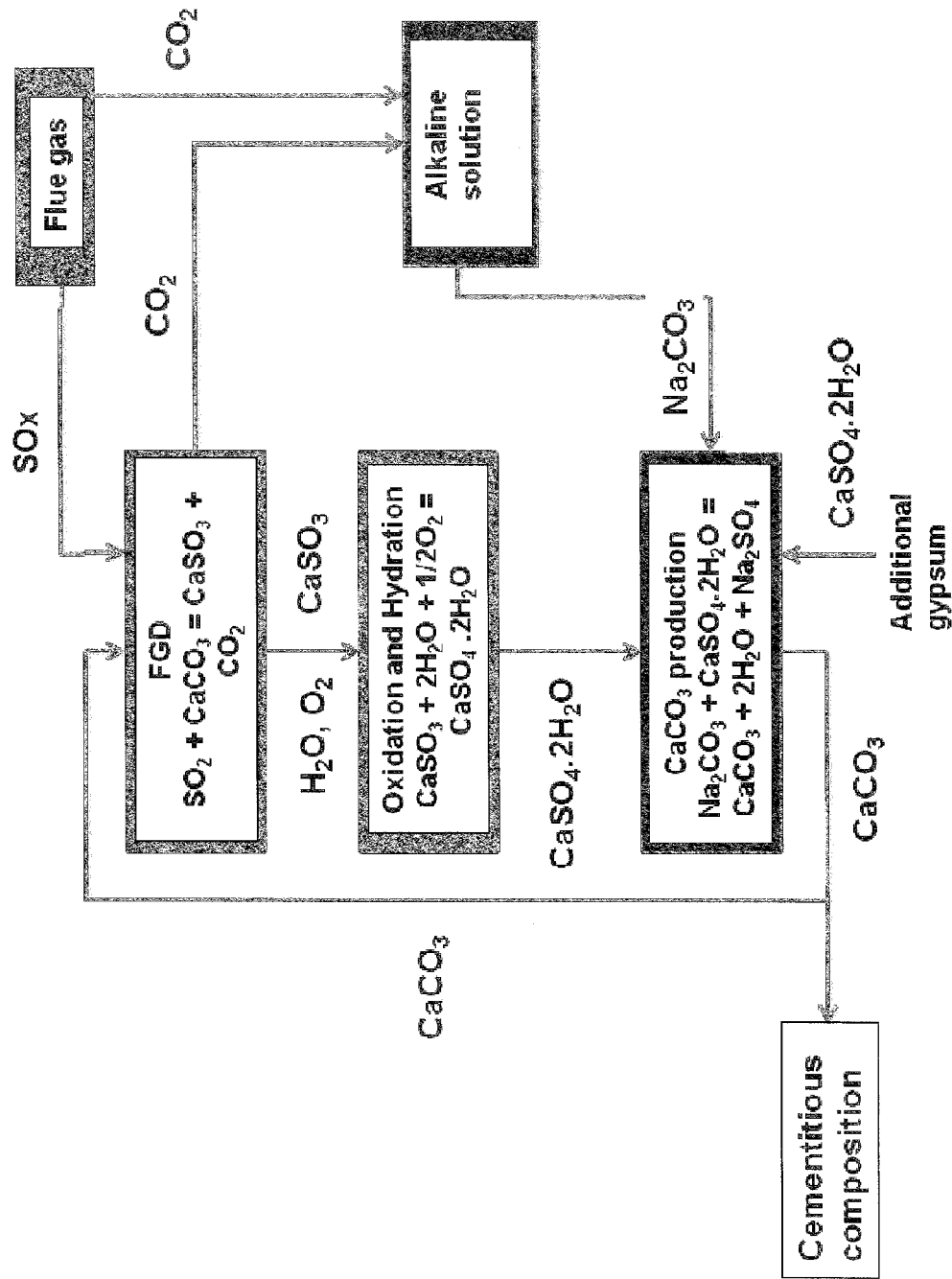
FIG. 2 illustrates a flow diagram for some embodiments of the invention.

In some embodiments, the methods of the invention are integrated with the FGD process that produces gypsum, by capturing and looping the $C_{O2}$ from the FGD process, looping the calcium, and directing the sulfur species towards carbonate product. As illustrated in FIG. 2, the SOx gas from flue gas may be subjected to flue gas desulfurization producing calcium sulfite which after hydration may form calcium sulfate. This calcium sulfate solution or slurry may be used as is for the precipitation of calcium carbonate (by reacting with sodium carbonate) or may be dried to form the calcium sulfate powder prior to its use for the precipitation of calcium carbonate. The carbon dioxide emitted by the flue gas (and optionally from the FGD process) may be absorbed by an alkaline solution to form carbonate ions (such as sodium carbonate formed when the alkaline solution is sodium hydroxide solution). The sodium carbonate is then treated with calcium sulfate obtained from the FGD process to form the calcium carbonate containing composition of the invention. Accordingly, there is provided a method of making a composition, comprising contacting an industrial waste gas stream comprising carbon dioxide with an alkaline solution to form a carbon dioxide charged water; obtaining calcium sulfate from flue gas desulfurization process; and contacting the carbon dioxide charged water with the calcium sulfate to form a composition comprising a metastable component selected from the group consisting of vaterite, amorphous calcium carbonate, or combination thereof. In some embodiments, the industrial waste gas stream comprises the carbon dioxide from flue gas and the carbon dioxide from the FGD process.

Depending upon the particle size of the sourced calcium sulfate, the calcium sulfate may be crushed, pulverized, ground, comminuted, or the like in size reducer. In some embodiments, the particle size of the calcium sulfate may be less than 1000 microns, 900 microns, 800 microns, 700 microns, 600 microns, 500 microns, 400 microns, 300 microns, 200 microns, 150 microns, 100 microns, 75 microns, 50 microns in the longest dimension. In some embodiments, the particle size of the calcium sulfate may be greater than 50 microns, 75 microns, 100 microns, 150 microns, 200 microns, 300 microns, 400 microns, 500 microns, 600 microns, 700 microns, 800 microns, 900 microns, 1000 microns in the longest dimension. In some embodiments, the particle size of the calcium sulfate may be between 50-500 microns, or between 50-200 microns, or between 50-100 microns. Calcium sulfate of the desired particle size may then be combined in with the carbon dioxide charged water comprising carbonate ions such as $Na_2CO_3$ to form calcium carbonate precipitate.

Carbon Dioxide

Illustrated in FIG. 1 is an aqueous-based method for processing carbon dioxide (30) and producing a composition comprising carbonates, bicarbonates, or carbonates and bicarbonates. The source of $CO_2$ that is used in the embodiments provided herein may be any convenient $CO_2$ source. The $CO_2$ source may be a liquid, solid (e.g., dry ice) or gaseous $CO_2$ source. In certain embodiments, the $CO_2$ source is a gaseous $CO_2$ source. This gaseous $CO_2$ is, in some embodiments, a waste stream or product from an industrial plant. The nature of the industrial plant may vary in these embodiments, where industrial plants of interest include power plants, chemical processing plants, steel mills, paper mills, cement plants, and other industrial plants that produce $CO_2$ as a byproduct. The industrial waste gas stream includes a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the methods include both reducing, e.g., syngas, shifted syngas, natural gas, and hydrogen and the like, and oxidizing condition streams, e.g., flue gases from combustion. Particular multi-component gaseous streams of interest that may be treated according to the invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams for the invention include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods of the invention.

Waste streams produced by cement plants are also suitable for systems and methods of the invention. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

Waste gas streams suitable for the invention may further comprise one or more additional components including water; sulfur oxides (SOx); nitrogen oxides (NOx); carbon monoxide (CO); metals such as antimony (Sb), arsenic (As), barium (Ba), beryllium (Be), boron (B), cadmium (Cd), chromium (Cr), cobalt (Co), copper (Cu), lead (Pb), manganese (Mn), mercury (Hg), molybdenum (Mo), nickel (Ni), radium (Ra), selenium (Se), silver (Ag), strontium (Sr), thallium (Tl), vanadium (V), and zinc (Zn), wherein the metals may be in any available form including, but not limited to, an elemental form (e.g., HgO), a salt (e.g., $HgCl_2$), an inorganic compound (e.g., HgO), an organic compound (e.g., an organomercury compound), or particulate form (e.g., Hg(p)); particulate matter (suspended particles of solids or liquids) such as fly ash, dust (e.g., from calcining), and metals; halides such as hydrogen chloride and hydrogen fluoride, which may also be considered acid gases along with, for example, SOx (e.g., $SO_3$, $SO_2$); organics such as volatile organic compounds (VOCs), hydrocarbons, dioxins, and polyaromatic hydrocarbons (PAHs); toxic substances such as hydrogen cyanide and sulfur nitrate ($SNO_3$); and radioactive isotopes such as uranium (U) and thorium (Th), any one or more (e.g., two or more, three or more, four or more, five or more, etc.) of which may be sequestered in a composition of the invention.

In some embodiments, the invention provides for at least 1%, 5%, 10%, 25%, 30%, 40%, 50%, 60%, 70%, 75%, 80%, 85%, 90%, 95%, 96%, 97%, 98%, 99%, 99.9%, or 99.99% removal of one or more of the additional waste gas stream components, wherein each of the one or more components may be removed at the same or a different percentage level. For example, in some embodiments, 98% of the SOx and 95% of the mercury may be removed from a waste gas stream using systems and methods of the invention, while, in other embodiments, 98% of the SOx and 98% of the mercury may be removed from the waste gas stream. In another exemplary embodiment, at least 99% $SO_2$, at least 88% $SO_3$, and 81% HCl, each of which may be considered an acid gas, may be removed from a waste gas stream using systems and methods of the invention. In such an embodiment, the invention provides for at least 80% removal of acid gases (e.g., SOx, HCl, etc.). In addition to the foregoing, at least 10%, 20%, 30%, 40%, 50%, 60%, 70%, 80%, 90%, 95%, 96%, 97%, 98%, 99%, 99.9%, or 99.99% of the carbon dioxide may be removed from the waste gas stream.

Contact protocols for absorbing $CO_2$, include, but are not limited to: direct contacting protocols, e.g., bubbling the gas through the volume of water, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

A variety of different methods may be employed to prepare the cementitious compositions of the invention. $CO_2$ sequestration protocols of interest include, but are not limited to, those disclosed in U.S. patent application Ser. No. 12/126,776, filed 23 May 2008; Ser. No. 12/163,205, filed 27 Jun. 2008; Ser. No. 12/486,692, filed 17 Jun. 2009; Ser. No. 12/501,217, filed 10 Jul. 2009; and Ser. No. 12/557,492, filed 10 Sep. 2009; as well as International Application No. PCT/US08/88318, filed 24 Dec. 2008; and PCT/US09/45722, filed 29 May 2009; the disclosures of which are herein incorporated by reference in their entireties.

In some embodiments, the absorbing solution charged with the partially or fully dissolved $CO_2$ is made by parging or diffusing the $CO_2$ gaseous stream through a solution to make a $CO_2$ charged water. In some embodiments, the solution with $CO_2$ includes an alkaline agent or a proton removing agent or a pH raising agent. In some embodiments, the $CO_2$ gas is bubbled or parged through a solution containing alkali, such as sodium or potassium hydroxide or sodium or potassium carbonate, in an absorber. In some embodiments, the absorber may include a bubble chamber where the $CO_2$ gas is bubbled through the solution containing the alkali. In some embodiments, the absorber may include a spray tower where the solution containing the alkali is sprayed or circulated through the $CO_2$ gas. In some embodiments, the absorber may include a pack bed to increase the surface area of contact between the $CO_2$ gas and the solution containing the alkali. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety. The $CO_2$ charged water may be then contacted with the divalent cation i.e. alkaline earth metal containing water to form the carbonate composition.

Absorbing Solution/Alkaline Solution

In some embodiments, the absorbing solution that comes into contact with the $CO_2$ source is an alkaline solution. An "alkaline solution" or "alkali" or "proton removing agent" or "pH raising agent", as used herein, includes solutions of pH greater than 8, e.g. 8-14, such as solution of, but not limited to, NaOH, $Na_2CO_3$, KOH, $K_2CO_3$, $NH_4OH$, $Mg(OH)_2$, or combinations thereof. In some embodiments, the absorbing solution is a saltwater solution comprising the alkali. A saltwater, as used herein, includes, but is not limited to, sea water, brackish water, brines, and salt containing solutions, such as, sodium chloride solutions. Other absorbing solutions that may be used in methods of the invention to contact the $CO_2$ from the $CO_2$ source include, but are not limited to, water, municipal water, surface water, amine solutions, non-aqueous solutions, organic solvent solutions, or any combination thereof. Absorbing solution may be used to remove gaseous carbon dioxide from a gaseous source of carbon dioxide in a gaseous carbon dioxide removal process.

In some embodiments, the proton-removing agent is naturally occurring and encompasses any proton-removing agents found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are described in U.S. patent application Ser. No. 12/501,217, filed 10 Jul. 2009, which is incorporated herein by reference in its entirety. Some embodiments provide for using naturally occurring bodies of water as a source proton-removing agent, which bodies of water comprise carbonate, borate, sulfate, or nitrate alkalinity, or some combination thereof. Any alkaline brine (e.g., surface brine, subsurface brine, a deep brine, etc.) is suitable for use in the invention. In some embodiments, surface brine comprising carbonate alkalinity provides a source of proton-removing agents. In some embodiments, surface brine comprising borate alkalinity provides a source of proton-removing agents. In some embodiments, subsurface brine comprising carbonate alkalinity provides a source of proton-removing agents. In some embodiments, subsurface brine comprising borate alkalinity provides a source of proton-removing agents. In some embodiments, deep brine comprising carbonate alkalinity provides a source of proton-removing agents. In some embodiments, deep brine comprising borate alkalinity provides a source of proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. For additional sources of brines and evaporites, see U.S. Provisional Patent Application No. 61/264,564, filed 25 Nov. 2009, which is incorporated herein by reference in its entirety.

In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., Bacillus pasteurii, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to enhance dissolution of $CO_2$ and accelerate precipitation of precipitation material, as described in further detail herein.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)2$), or magnesium hydroxide ($Mg(OH)2$). Organic bases are carbon-containing molecules that are generally nitrogenous bases including primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for preparation of compositions of the invention. In some embodiments, ammonia is used to raise pH to a level sufficient for preparation of compositions of the invention. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations (e.g., $Ca^{2+}$, $Mg^{2+}$, etc.) and other suitable metal forms suitable for use in the invention, waste streams from various industrial processes (i.e., industrial waste streams) may provide proton-removing agents. Such waste streams include, but are not limited to, mining wastes; ash (e.g., coal ash such as fly ash, bottom ash, boiler slag); slag (e.g. iron slag, phosphorous slag); cement kiln waste (e.g., cement kiln dust (CKD)); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Red mud, depending on processing conditions and source material (e.g., bauxite) may comprise $Fe_2O_3$, $Al_2O_3$, $SiO_2$, $Na_2O$, CaO, $TiO_2$, $K_2O$, MgO, $CO_2$, $S_2O$, $MnO_2$, $P_2O_5$. Coal ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

The alkali such as NaOH, KOH, $Na_2CO_3$, etc. may be made using any electrochemical method known in the art. Some examples of the electrochemical methods are described herein below.

Electrochemical Methods

Electrochemical methods may be used to produce alkalinity, such as hydroxide species (e.g. NaOH, KOH, $OH^-$) or carbonate species (e.g. $Na_2CO_3$, $K_2CO_3$, $H_2CO_3$, $CO_3^{2-}$). Electrochemical methods may be used to produce alkalinity at a cathode, such as hydroxide species (e.g. NaOH, KOH, $OH^-$) or carbonate species (e.g. $Na_2CO_3$, $K_2CO_3$, $H_2CO_3$, $CO_3^{2-}$). The electrochemical methods of the invention are described in more detail in commonly assigned applications with application Ser. No. 12/541,055, filed Aug. 13, 2009; Ser. No. 12/503,557, filed Jul. 15, 2009; and Ser. No. 13/474,598, filed May 17, 2012, and commonly assigned U.S. Pat. Nos. 7,875,163 and 7,790,012, each of which are incorporated by reference herein in their entirety.

Figure 3:
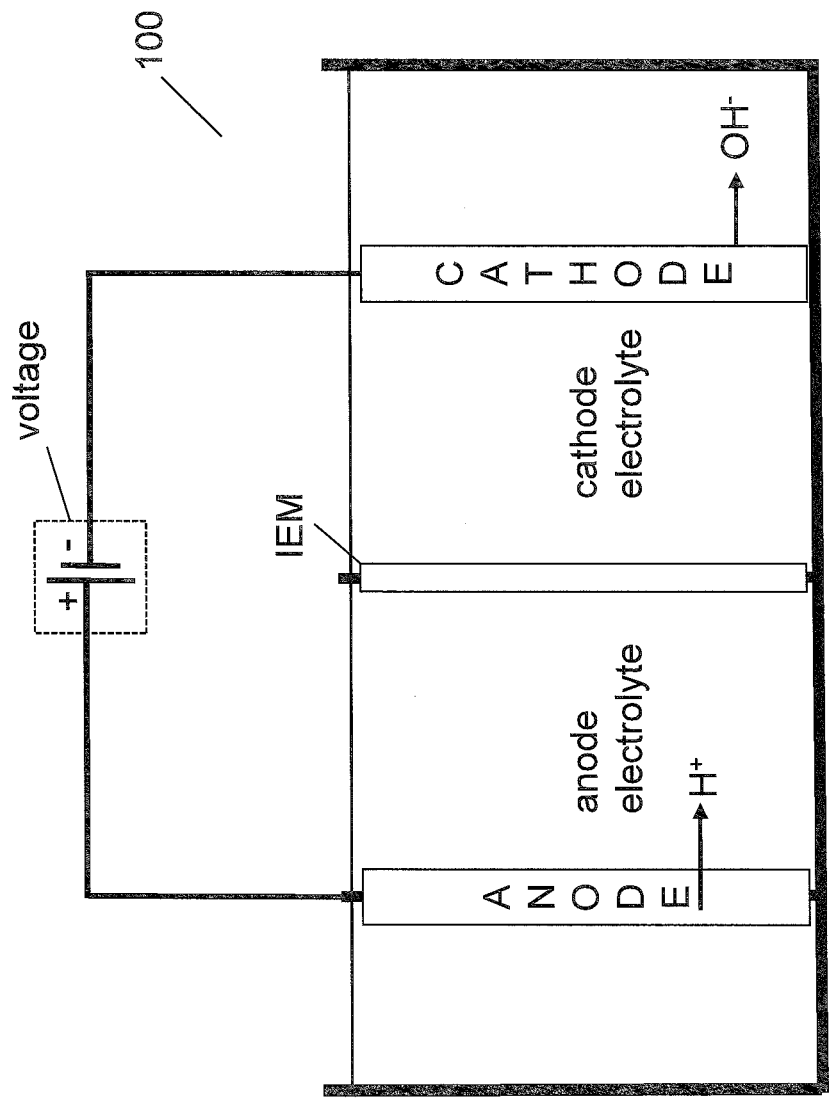
FIG. 3 illustrates an exemplary electrochemical cell.
Figure 4:
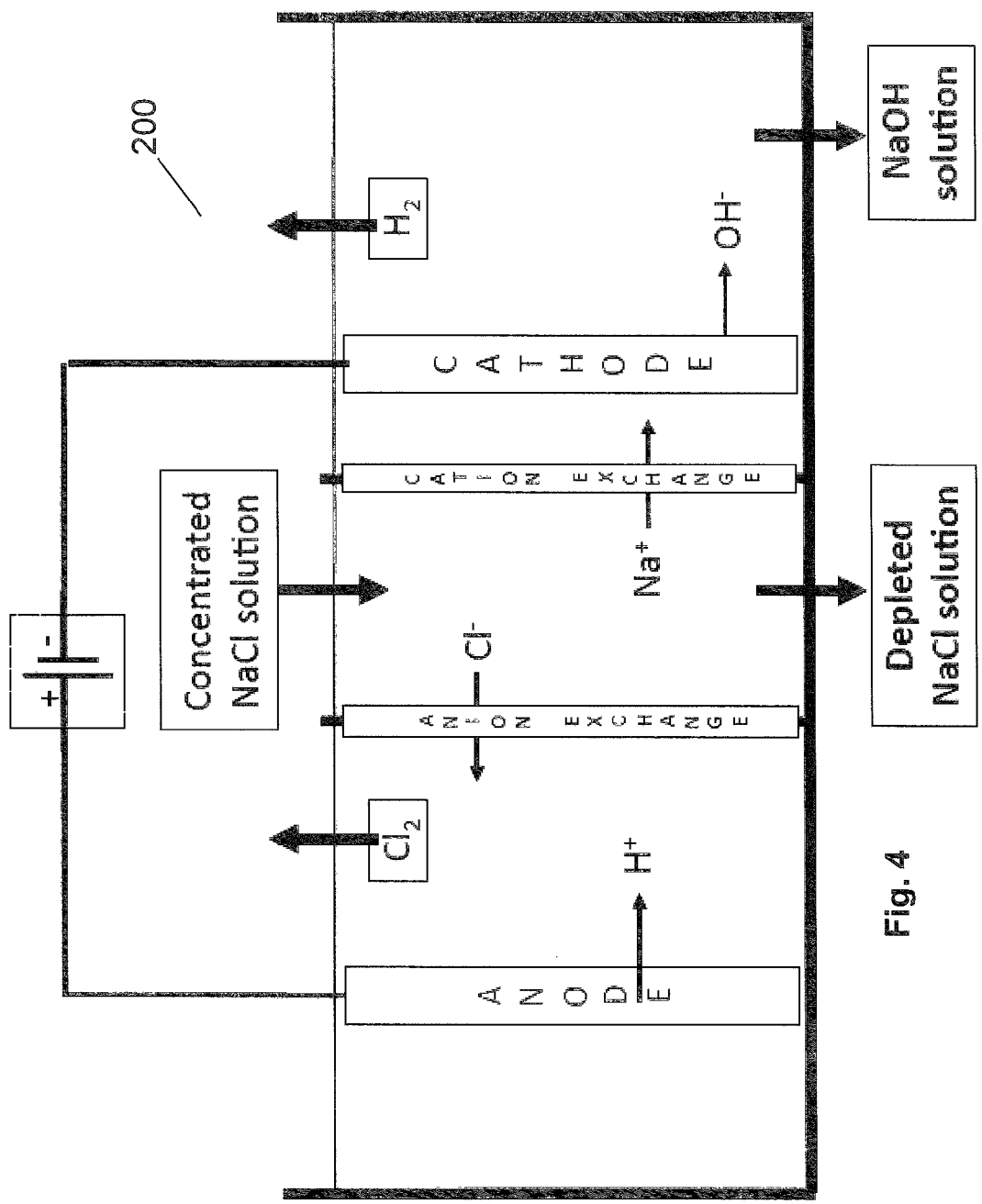
FIG. 4 illustrates an exemplary electrochemical cell.

In some embodiments, the electrochemical cell includes at least one unit cell, the unit cell including at least a cathode, an anode, at least one ion exchange membrane, electrolytes, and a potentiostat device for applying a voltage across the anode and cathode of such a unit cell or a collection of units cells that could be in stacked in a larger electrochemical cell. An example of the electrochemical cell is illustrated in FIG. 3 where the electrochemical cell 100 has a cathode chamber containing the cathode and the cathode electrolyte; an anode chamber containing the anode and the anode electrolyte; and an ion exchange membrane between the cathode chamber and the anode chamber. The hydroxide is formed in the cathode electrolyte and depending on the electrolyte used an acid is formed in the anode electrolyte. For example, if sodium chloride is used as the anode electrolyte, then chloride ions may combine with the hydrogen ions formed at the anode to form acid in the anode electrolyte. The sodium ions may pass through the ion exchange membrane to the cathode electrolyte to form sodium hydroxide. It is to be understood that FIG. 3 is for illustration purposes only and deviations from the electrochemical cell are well within the scope of the invention as long as an alkali is formed in the cathode electrolyte. For example, the cell may contain an anion exchange membrane and a cation exchange membrane as illustrated in the electrochemical cell 200 in FIG. 4. As illustrated in FIG. 4, the hydrogen gas is formed at the cathode which is then transferred to the anode to form hydrogen ions.

In some embodiments, a potentiostat device is used to apply a voltage of 2.0V or less across the anode and the cathode of the electrochemical cell, resulting in production of alkalinity at the cathode without production of any gas at the anode. The alkaline solution may be withdrawn from the electrochemical cell to be used in the absorption of carbon dioxide to form the cementitious composition of the invention. In some embodiments, a potentiostat device is used to apply a voltage of 1.9V or less across an anode and a cathode of an electrochemical cell, resulting in production of alkalinity at the cathode without production of any gas at the anode, such as 1.8V or less, such as 1.7V or less, such as 1.6V or less, such as 1.5V or less, such as 1.4V or less, such as 1.3V or less, such as 1.2V or less, such as 1.1V or less, such as 1.0V or less, such as 0.9V or less, such as 0.8V or less, such as 0.7V or less, such as 0.6V or less, such as 0.5V or less resulting in the production of alkalinity at the cathode. In some embodiments, a potentiostat device is used to apply a voltage of 0.5V or less across an anode and a cathode of an electrochemical cell, resulting in production of alkalinity at the cathode without production of any gas at the anode.

In some embodiments, the acid formed in the anode electrolyte may be used for chlorination. In some embodiments, the acid may be used to chlorinate unsaturated hydrocarbons such as, but not limited to, ethylene, styrene etc. to form chlorinated products, such as, but not limited to, styrene chloride, vinyl chloride, etc. The chlorinated products may be then used as monomers (e.g. chlorinated products of olefins, acrylates, monomers of condensation polymers, ethylene, styrene, propylene, methyl methacrylate) to form polymers, such as but not limited to, poly(vinyl chloride) etc. In some embodiments, the unsaturated hydrocarbon may be added to the anode electrolyte where the acid formed in the anode electrolyte reacts with the unsaturated hydrocarbon to form chlorinated products. In some embodiments, the unsaturated hydrocarbon is treated with the acid outside the anode chamber to form the chlorinated products.

In some embodiments, the anode oxidizes metals to form metal chlorides in higher oxidation state which may be used to chlorinate the unsaturated or saturated hydrocarbons to form chlorinated hydrocarbons. The chlorinated hydrocarbons may be used to form vinyl chloride monomer and then PVC. The cathode in such systems forms hydroxides which may be used to form absorbing solution for absorbing carbon dioxide gas to form the cementitious compositions of the invention. Such electrochemical systems and methods are described in more detail in commonly assigned application with application Ser. No. 13/474,598, filed May 17, 2012, which is incorporated by reference herein in its entirety.

Figure 5:
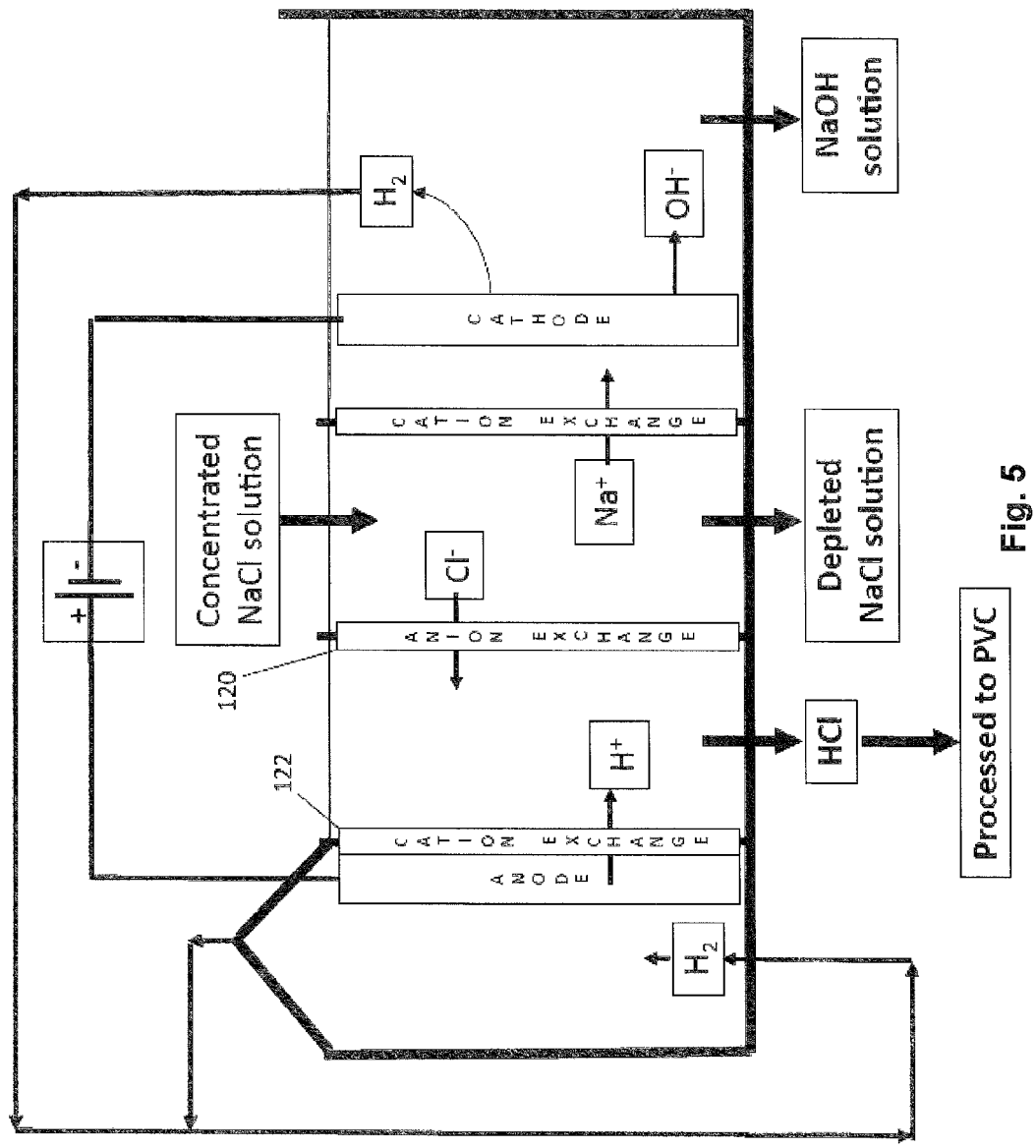
FIG. 5 illustrates an exemplary electrochemical cell.

An example of an electrochemical system used to process the alkali from the cathode electrolyte and acid from the anode electrolyte, is as illustrated in FIG. 5. As illustrated in FIG. 5, the electrochemical system is used to produce a hydroxide species (e.g. NaOH) and the byproducts of the electrochemical system (e.g. HCl) may be used to make vinyl chloride monomer. In this electrochemical system, no gas is produced at the anode.

In some embodiments, the carbon dioxide may be passed into the cathode electrolyte where the hydroxide dissolves the carbon dioxide to form carbonate/bicarbonate species. This cathode electrolyte containing the carbonate/bicarbonate species may be withdrawn from the cathode chamber and reacted with cations from gypsum to form the cementitious compositions of the invention. In some embodiments, the cathode electrolyte may be withdrawn and transferred to a contactor which is also connected to the source of carbon dioxide. The contactor containing the alkaline cathode electrolyte may then absorb the carbon dioxide to form carbonate/bicarbonate species in the solution. The carbonate/bicarbonate species containing solution may be contacted with the cations from gypsum to form cementitious compositions of the invention or the carbonate/bicarbonate species containing solution is recirculated back to the cathode chamber where the bicarbonate may be converted to the carbonate and the carbonate solution is withdrawn from the cathode chamber. Such electrochemical systems and methods are described in more detail in commonly assigned application with application Ser. No. 12/503,557, filed Jul. 15, 2009, which is incorporated by reference herein in its entirety.

Figure 6:
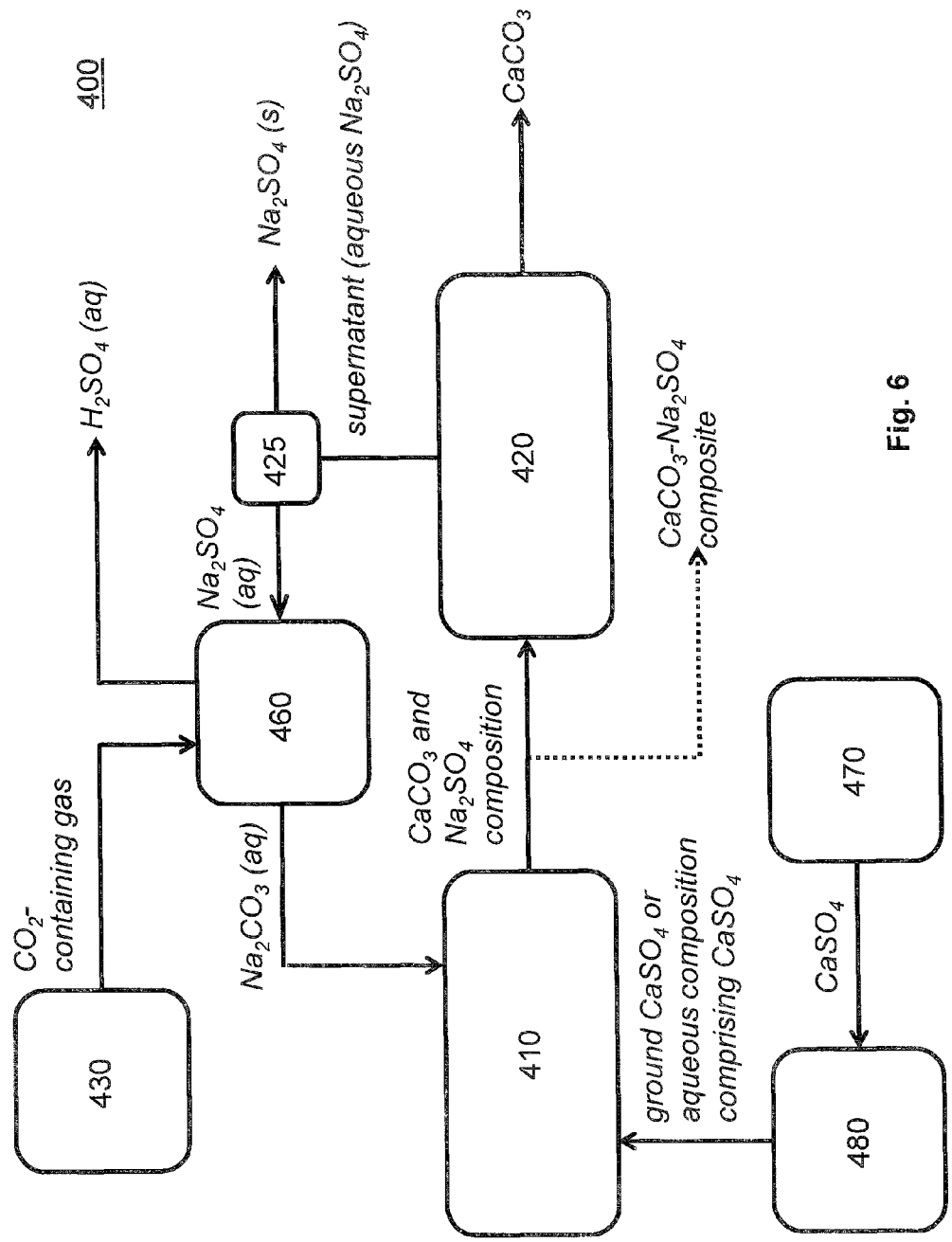
FIG. 6 illustrates a system for sequestration of $CO_2$ utilizing $CaSO_4$.

In some embodiments, system 400 of FIG. 6 is provided for using $CaSO_4$ to process a waste gas stream comprising $CO_2$ from an industrial plant as described herein. The carbon dioxide may be provided to electrochemical system 460 (or systems of FIGS. 3-5) from source of carbon dioxide 430 to produce an aqueous solution of sodium carbonate and an aqueous solution of sulfuric acid. Sulfuric acid, hydrochloric acid, and/or any other acid product that may be electrochemically produced as described herein may be used to digest fly ash and/or basalt to provide for a calcium sulfate source. The source of calcium sulfate 470 (after optional grinding 480), when combined with an aqueous solution of sodium carbonate 410 from electrochemical system 460, may react in accordance with the following equation to produce calcium carbonate:

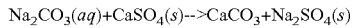

Such a product composition may have water removed to provide a $CaCO_3$—$Na_2SO_4$ composite material. The $CaCO_3$—$Na_2SO_4$ composites such as that described herein may have a compressive strength of at least 100 psi, 250 psi, 500 psi, 750 psi, 1000 psi, 1500 psi, 2000 psi, 2500 psi, 3000 psi, 3500 psi, 4000 psi, 4500 psi, 5000 psi after a single day of curing. In some embodiments, the $CaCO_3$—$Na_2SO_4$ composite has a compressive strength of no more than 5000 psi, 4500 psi, 4000 psi, 3500 psi, 3000 psi, 2500 psi, 2000 psi, 1500 psi, 1000 psi, 750 psi, 500 psi, 250 psi, 100 psi after a single day, 7 days, or 28 days of curing. In some embodiments, the composition resulting from the above reaction may be treated in treatment system 420. Both water and $Na_2SO_4$ may be subsequently removed, optionally with additional rinsing to provide a product comprising calcium carbonate, which calcium carbonate comprises metastable forms selected from amorphous calcium carbonate, vaterite, or a combination thereof. Such polymorphs may be used to make a self-cementing or hydraulic cement composition, supplementary cementitious material, aggregate, formed building materials, etc. As illustrated in FIG. 6, removed $NaSO_4$ may be provided to liquid-solid separator 425 to remove any solids (e.g. $Na_2SO_4$), and the aqueous solution of $Na_2SO_4$ may be provided to electrochemical system 460 to produce additional $Na_2CO_3$ and $H_2SO_4$ for the $CO_2$-sequestration process utilizing calcium sulfate.

In some embodiments, an order for the addition of the $CO_2$ or the $CO_2$ charged water and gypsum containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing gypsum for precipitation of the carbonate precipitate in the precipitation step 20 (illustrated in FIG. 1). In some embodiments, gypsum is added to the reactor containing the $CO_2$ gaseous stream or the solution containing the partially or fully dissolved $CO_2$ or the affluent from the absorber containing an alkaline solution of $CO_2$ or the $CO_2$ charged water for precipitation of the carbonate precipitate in the precipitation step 20. In some embodiments, the gypsum powder or gypsum containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

Precipitation Conditions

In some embodiments, the methods described herein include contacting the carbon dioxide charged water with gypsum under precipitation conditions that favor the formation of the cementitious composition comprising a metastable component selected from the group consisting of vaterite, amorphous calcium carbonate, and combination thereof. In some embodiments, the precipitation conditions favor the formation of more than 50 wt % vaterite or between 50-99 wt % vaterite in the cementitious composition. Accordingly, there are provided methods for making a composition, comprising a) contacting an industrial waste gas stream comprising carbon dioxide with an alkaline solution to form a carbon dioxide charged water; and b) contacting the carbon dioxide charged water with calcium sulfate under one or more precipitation conditions that favor the formation of a composition comprising a metastable component selected from the group consisting of vaterite, amorphous calcium carbonate, and combination thereof.

In some embodiments, the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combination thereof. Accordingly, there are provided methods for making a composition, comprising a) contacting an industrial waste gas stream comprising carbon dioxide with an alkaline solution to form a carbon dioxide charged water; and b) contacting the carbon dioxide charged water with calcium sulfate under one or more precipitation conditions that favor the formation of a composition comprising a metastable component selected from the group consisting of vaterite, amorphous calcium carbonate, and combination thereof, wherein the one or more precipitation conditions include, but not limited to, temperature, pH, residence time, proton removing agent, additive, ion ratio, rate of precipitation, mixing rate, form of agitation, presence of seed crystal, catalyst, membrane, or substrate, separation, drying, refining, or combination thereof.

Some of the precipitation conditions are described in commonly assigned U.S. Pat. Nos. 7,735,274, and 8,062,418, both of which are incorporated herein by reference in their entirety.

At precipitation step 20 (FIG. 1), carbonate compounds, which may be amorphous or crystalline, are precipitated. Precipitation conditions include those that change the physical environment of the water to produce the desired precipitate product. In some embodiments, the precipitation conditions include temperature of the aqueous solution, including adjustment the solution temperature to between 0° C. and 100° C., such as between 5° C. and 90° C., such as between 10° C. and 80° C., such as between 20° C. and 60° C., such as between 20° C. and 50° C.

The residence time of the precipitate in the reactor before the precipitate is removed from the solution, may vary. In some embodiments, the residence time of the precipitate in the solution is more than 5 seconds, or between 5 seconds-1 hour, or between 5 seconds-1 minute, or between 5 seconds to 20 seconds, or between 5 seconds to 30 seconds, or between 5 seconds to 40 seconds. Without being limited by any theory, it is contemplated that the residence time of the precipitate may affect the size of the particle. For example, a shorter residence time may give smaller size particles or more disperse particles whereas longer residence time may give agglomerated or larger size particles. In some embodiments, the residence time in the process of the invention may be used to make small size as well as large size particles in a single or multiple batches which may be separated or may remain mixed for later steps of the process. In some embodiments, the finely disperse particles may be processed further to give the composition of the invention. In some embodiments, the large or agglomerated particles may be processed to give the cementitious composition of the invention.

While the pH of the water may range from 7 to 14 during a given precipitation process, in certain embodiments the pH is raised to alkaline levels in order to drive the precipitation of carbonate compound as desired. In some embodiments, the pH is raised to a level which minimizes if not eliminates $CO_2$ gas generation production during precipitation. In these embodiments, the pH may be raised to 10 or higher, such as 11 or higher.

The nature of the precipitate may be affected by the pH of the precipitation process. In some embodiments, the high pH may lead to rapid precipitation and agglomeration of the particles whereas lower pH or slow raise in the pH may lead to finer particles. Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives. For example, vaterite, an unstable or metastable polymorph of $CaCO_3$ which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitate can also be influenced by selection of appropriate major ion ratios. Major ion ratios also have influence of polymorph formation. For example, the concentration of magnesium ions may be optimized such that as the magnesium:calcium ratio in the water increases, aragonite may become the favored polymorph of calcium carbonate over low-magnesium calcite. At low magnesium:calcium ratios, low-magnesium calcite is the preferred polymorph. As such, a wide range of magnesium:calcium ratios can be employed, including, e.g., 100/1, 50/1, 20/1, 10/1, 5/1, 2/1, 1/1, 1/2, 1/5, 1/10, 1/20, 1/50, 1/100. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation may also have an effect on compound phase formation. The most rapid precipitation can be achieved by seeding the solution with a desired phase. Without seeding, rapid precipitation can be achieved by rapidly increasing the pH of the water, which results in more amorphous constituents. When silica is present, the more rapid the reaction rate, the more silica is incorporated with the carbonate precipitate. The higher the pH is, the more rapid the precipitation is and the more amorphous the precipitate is.

Accordingly, a set of precipitation conditions to produce a desired precipitate from a water include, in certain embodiments, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system.

$CO_2$ charging and carbonate compound precipitation may occur in a continuous process or at separate steps. As such, charging and precipitation may occur in the same reactor of a system, e.g., as illustrated in FIG. 1 at step 20, according to certain embodiments of the invention. In yet other embodiments of the invention, these two steps may occur in separate reactors, such that the water is first charged with $CO_2$ in a charging reactor and the resultant $CO_2$ charged water is then subjected to precipitation conditions in a separate reactor.

In certain embodiments, the methods further include contacting the volume of water that is subjected to the mineral precipitation conditions with $CO_2$. Contact of the water with the $CO_2$ may occur before and/or during the time when the water is subjected to $CO_2$ precipitation conditions. Accordingly, embodiments of the invention include methods in which the volume of water is contacted with $CO_2$ prior to subjecting the volume of salt water to mineral precipitation conditions. Embodiments of the invention include methods in which the volume of salt water is contacted with the $CO_2$ while the volume of salt water is being subjected to carbonate compound precipitation conditions (such as addition of gypsum). Embodiments of the invention include methods in which the volume of water is contacted with the $CO_2$ both prior to subjecting the volume of salt water to carbonate compound precipitation conditions and while the volume of salt water is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which more gypsum may be added, that can have more carbon dioxide charged water cycled through it, precipitating more carbonate compounds.

The above described processes result in the production of a slurry of a carbonate containing precipitate and a mother liquor. Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

Following production of the carbonate precipitate from the water, the resultant precipitated carbonate compound composition is separated from the mother liquor to produce separated carbonate compound precipitate product, as illustrated at step 40 of FIG. 1. The slurry components are separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ is carried out in a manner sufficient to reduce the pH to a range between 5 and 9, e.g., 6 and 8.5, including 7.5 to 8.2. In certain embodiments, the treated brine may be contacted with the $CO_2$, e.g., as described above, to sequester further $CO_2$. For example, where the mother liquor is to be returned to the ocean, the mother liquor may be contacted with the $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be disposed of using any convenient protocol. In certain embodiments, it may be sent to a tailings pond for disposal 42. In certain embodiments, it may be disposed of in a naturally occurring body of water, e.g., ocean, sea, lake or river. In certain embodiments, the mother liquor is returned to the source of feedwater for the methods of invention. Alternatively, the mother liquor may be further processed, e.g., subjected to desalination protocols, as described further in U.S. application Ser. No. 12/163,205, filed Jun. 27, 2008; the disclosure of which is herein incorporated by reference. In some embodiments, the mother liquor may be processed to remove remaining gypsum which may be re-used or recirculated for the precipitation reaction.

In certain embodiments, following production of the carbonate precipitate, the resultant product is separated from the mother liquor to produce separated carbonate composition. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitate.

The resultant dewatered precipitate is then dried to produce a product, as illustrated at step 60 of FIG. 1. Drying can be achieved by air drying the filtrate. Where the filtrate is air dried, air drying may be at room or elevated temperature. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc.

Where desired, the dewatered precipitate product from the separation reactor 40 may be washed before drying, as illustrated at optional step 50 of FIG. 1. The precipitate may be washed with freshwater, e.g., to remove salts (such as NaCl) from the dewatered precipitate. Used wash water may be disposed of as convenient, e.g., by disposing of it in a tailings pond, etc. The precipitate may be rinsed with activators as described above.

At step 70, the dried precipitate is refined, e.g., to provide for desired physical characteristics, such as particle size, surface area, etc., or to add one or more components to the precipitate, to produce the cementitious composition 80. In certain embodiments, the precipitate product is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

In some embodiments, the particles with different morphologies, such as fine or agglomerated, and/or the particles with different sizes may be mixed to make the cementitious compositions of the invention. For example, the cementitious composition of the invention may include a mix of fine disperse particles with larger agglomerated particles or the cementitious composition of the invention may include a mix of particles with different sizes, e.g., particles with sizes ranging between 0.1 micron to 100 micron. In some embodiments, the cementitious composition of the invention may be modulated by mixing the particles with different particle size, surface area, zeta potential, and/or morphologies.

The vaterite containing cementitious composition may be optionally activated by refining, milling, aging, and/or curing, e.g., to provide for desired physical characteristics, such as activation, particle size, surface area, zeta potential, etc. The vaterite containing cementitious composition may also be activated by adding an aragonite seed, inorganic additive or organic additive. Further, one or more components may be added to the composition, such as the reinforcing material and aggregate, or sand, or rocks etc., to produce the concrete composition of the invention.

Method of Converting Vaterite to Aragonite

The cementitious composition of the invention may be contacted with water when the cementitious composition sets and hardens to form cement. In some embodiments, the composition of the invention after mixing in the water is poured into the molds designed to make one or more of the pre-formed building material. The composition is then allowed to set and harden into the pre-formed or pre-cast material.

The amorphous calcium carbonate (ACC) and/or vaterite present in the cementitious composition when come into contact with water, may precipitate and transform into one or more of its stable phases (aragonite and/or calcite). A thermodynamic driving force may exist for the transformation from unstable phases to more stable phases, as described by Ostwald in his Step Rule (Ostwald, W. *Zeitschrift fur Physikalische Chemie* 289 (1897)). For this reason, calcium carbonate phases transform in the order: ACC to vaterite, aragonite, and calcite where intermediate phases may or may not be present. For instance, ACC can transform to vaterite and may not transform to aragonite or calcite; or ACC can transform to vaterite and then directly to calcite, skipping the aragonite form; or alternatively, ACC can transform to vaterite and then to aragonite without transforming to calcite. In some embodiments, the vaterite containing cementitious compositions of the invention transform to aragonite after dissolution and reprecipitation. During this transformation, excesses of energy are released. This intrinsic energy may be harnessed to create a strong aggregation tendency and surface interactions that may lead to agglomeration and cementing.

The transformation between calcium carbonate polymorphs may occur via solid-state transition or may be solution mediated. In some embodiments, the transformation is solution-mediated because it may require less energy than the thermally activated solid-state transition. The solution-mediated transformation is environmentally conscious and more applicable to a cementing application. Vaterite is metastable and the difference in thermodynamic stability of calcium carbonate polymorphs may be manifested as a difference in solubility, where the least stable phases are the most soluble (Ostwald, supra.). Therefore, vaterite may dissolve readily in solution and transform favorably towards a more stable polymorph: aragonite. The driving force for the formation of a particular calcium carbonate polymorph or combination of polymorphs is the change in Gibbs free energy from a supersaturated solution to equilibrium (Spanos & Koutsoukos *Journal of Crystal Growth* (1998) 191, 783-790).

In a polymorphic system like calcium carbonate, two kinetic processes may exist simultaneously in solution: dissolution of the metastable phase and growth of the stable phase (Kralj et al. *Journal of Crystal Growth* (1997) 177, 248-257). In some embodiments, the aragonite or calcite crystals may be growing while vaterite is undergoing dissolution in the aqueous medium.

In some embodiments, the composition of the invention, as prepared by the methods described herein, is treated with the aqueous medium under one or more suitable conditions. The aqueous medium includes, but is not limited to, fresh water optionally containing sodium chloride, calcium chloride, magnesium chloride, or combination thereof or aqueous medium may be brine. In some embodiments, aqueous medium is fresh water. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-60° C.; or 0-40° C.; or 25-100° C.; or 25-50° C.; or 37-100° C.; or 37-60° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition of the invention (aqueous medium:dry components or aqueous medium:composition of the invention) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

In some embodiments, the composition may be rinsed with fresh water to remove halite or the chloride content from the composition. The chloride may be undesirable in some applications, for example, in aggregates intended for use in concrete since the chloride may have a tendency to corrode rebar. Further, the rinsing of the slurry or the composition with water may cause the vaterite in the composition to shift to more stable forms such as aragonite and result in the cemented material. For example, the cementing composition can be kept in the saltwater until before use and is rinsed with fresh water that may remove the halite from the composition and facilitate the formation of the cemented material.

In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the composition, thereby reducing the yield loss and the conversion to cemented material.

During the mixing of the composition with the aqueous medium, the composition may be subjected to high shear mixer. After mixing, the composition may be dewatered again and placed in pre-formed molds to make formed building materials. Alternatively, the composition may be mixed with water and is allowed to set. The composition sets over a period of days and is then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The composition is then subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

The cement product produced by the methods described above may be an aggregate or building material or a pre-cast material or a formed building material. These materials have been described herein.

B. Compositions

In some embodiments, the methods of the invention form the compositions comprising metastable components selected from the group consisting of vaterite, amorphous calcium carbonate, and combination thereof. The "cementitious composition" as used herein includes calcium carbonate containing compositions. In some embodiments, the cementitious compositions after combination with water set and harden into cement. The cementitious compositions may be a self-cement or hydraulic cement composition, a supplementary cementitious material (SCM), an aggregate, or combination thereof. The self-cementing composition may be chopped up to form aggregates.

As used herein, "hydraulic cement" or "self-cement" includes a composition which sets and hardens after combining with water or a solution where the solvent is water, e.g., an admixture solution. After hardening, the compositions retain strength and stability even under water. As a result of the immediately starting reactions, stiffening can be observed which may increase with time. After reaching a certain level, this point in time may be referred to as the start of setting. The consecutive further consolidation may be called setting, after which the phase of hardening begins. The compressive strength of the material may then grow steadily, over a period which ranges from a few days in the case of "ultra-rapid-hardening" cements, to several months or years in the case of other cements. Setting and hardening of the product produced by combination of the composition of the invention with an aqueous liquid may or may not result from the production of hydrates that may be formed from the composition upon reaction with water, where the hydrates are essentially insoluble in water. Cements may be employed by themselves or in combination with aggregates, both coarse and fine, in which case the compositions may be referred to as concretes or mortars. Cements may also be cut and chopped to form aggregates.

Some detailed description for making and using such materials may be found in commonly assigned U.S. Pat. Nos. 7,735,274 and 8,062,418, both of which are herein incorporated by reference in their entirety.

The cementitious compositions of the invention are formed by sequestering carbon dioxide from a carbon dioxide source such as, but not limited to flue gases from power plants or carbon dioxide emitted by cement plants and the like. In some embodiments, the cementitious composition contains carbon derived from a fuel used by humans, e.g., carbon having a fossil fuel origin. For example, in some embodiments, the cementitious compositions of the invention contain carbon that was released in the form of $CO_2$ from the combustion of fuel. In certain embodiments, the carbon sequestered in the cementitious composition is in the form of a carbonate compound. Therefore, in certain embodiments, the cementitious compositions provided herein contain carbonate compounds where at least part of the carbon in the carbonate compounds is derived from a fuel used by humans, e.g., a fossil fuel. As such, production of the compositions of the invention results in the placement of $CO_2$ into a storage stable form in the cementitious composition. Production of the cementitious compositions of the invention thus results in the prevention of $CO_2$ gas from entering the atmosphere. The compositions of the invention provide for storage of $CO_2$ in a manner such that $CO_2$ sequestered (i.e., fixed) in the composition does not become part of the atmosphere. As such, where the compositions are consumable compositions, the $CO_2$ fixed therein remains fixed for the life of the consumable, if not longer.

The cementitious compositions of the invention include compositions that contain carbonates and/or bicarbonates, which may be in combination with a divalent cation such as calcium from calcium sulfate. The carbonates and/or bicarbonates may be in solution, in solid form, or a combination of solution and solid form, e.g., a slurry. The carbonates and/or bicarbonates may contain carbon dioxide from a source of carbon dioxide; in some embodiments the carbon dioxide originates from the burning of fossil fuel, and thus some (e.g., at least 10, 50, 60, 70, 80, 90, 95%) or substantially all (e.g., at least 99, 99.5, or 99.9%) of the carbon in the carbonates and/or bicarbonates is of fossil fuel origin, i.e., of plant origin. As is known, carbon of plant origin has a different ratio of stable isotopes ($^{13}C$ and $^{12}C$) than carbon of inorganic origin, and thus the carbon in the carbonates and/or bicarbonates, in some embodiments, has a $\delta^{13}C$ of less than, e.g., −10‰, or less than −15‰, or less than −20‰, or less than −35‰, or less than −30‰, or less than −35‰.

In some embodiments, compositions provided herein contain carbon from fossil fuel; because of its fossil fuel origin, the carbon isotopic fractionation ($\delta^{13}C$) value of such compositions may be different from that of compositions containing inorganic carbon, e.g., limestone. Typically, the plants from which fossil fuels are derived may preferentially utilize $^{12}C$ over $^{13}C$, thus fractionating the carbon isotopes so that the value of their ratio differs from that in the atmosphere in general; this value, when compared to a standard value (PeeDee Belemnite, or PDB, standard), is termed the carbon isotopic fractionation ($\delta^{13}C$) value. $\delta^{13}C$ values for coal are generally in the range −30 to −20‰ and $\delta^{13}C$ values for methane may be as low as −20‰ to −40‰ or even −40‰ to −80‰. $\delta^{13}C$ values for atmospheric $CO_2$ are −10‰ to −7‰, for limestone+3‰ to −3‰, and for marine bicarbonate, no.

Precipitation material, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}C\ \text{‰} = [(^{13}C/^{12}C_{sample} - ^{13}C/^{12}C_{PDB\ standard})/(^{13}C/^{12}C_{PDB\ standard})] \times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Table I lists relative carbon isotope composition value ranges for relevant carbon sources for comparison.

Composition incorporating carbon from burning fossil fuels may reflect $\delta^{13}C$ values that are like those of plant derived material, i.e. less, than that which incorporates carbon from atmospheric or non-plant marine sources. Verification that the material produced by a carbon dioxide sequestering process is composed of carbon from burning fossil fuels can include measuring the $\delta^{13}C$ value of the resultant material and confirming that it is not similar to the values for atmospheric carbon dioxide, nor marine sources of carbon.

TABLE I

Relative carbon isotope composition
($\delta^{13}$C) values for carbon sources of interest.

| Carbon Source | $\delta^{13}$C Range [‰] | $\delta^{13}$C Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate ($CO_3$) | −2 to +2 | 0 |
| Marine Bicarbonate ($HCO_3$) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1] Holdgate, G. R. et al., *Global and Planetary Change*, 65 (2009) pp. 89-103.
[2] Elswick, E. R. et al., *Applied Geochemistry*, 22 (2007) pp. 2065-2077.

As such, the $\delta^{13}$C value of the cementitious composition of the invention may serve as a fingerprint for a $CO_2$ gas source. The $\delta^{13}$C value may vary from source to source (i.e., fossil fuel source), but the $\delta^{13}$C value for composition provided herein may range between −9‰ to −35‰. In some embodiments, the $\delta^{13}$C value for the cementitious composition is between −9‰ and −50‰, or between −15‰ and −40‰, or between −15‰ and −35‰, or between −15‰ and −25‰. In some embodiments, the $\delta^{13}$C value for the cementitious composition is less than (i.e., more negative than) −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰. Any suitable method may be used for measuring the $\delta^{13}$C value, methods including, but not limited to, mass spectrometry or off-axis integrated-cavity output spectroscopy (off-axis ICOS). One difference between the carbon isotopes is in their mass. Any mass-discerning technique sensitive enough to measure the amounts of carbon we have can be used to find ratios of the $^{13}$C to $^{12}$C isotope concentrations. Mass spectrometry is commonly used to find $\delta^{13}$C values. Commercially available are bench-top off-axis integrated-cavity output spectroscopy (off-axis ICOS) instruments that are able to determine $\delta^{13}$C values as well. These values are obtained by the differences in the energies in the carbon-oxygen double bonds made by the $^{12}$C and $^{13}$C isotopes in carbon dioxide.

In some embodiments, the cementitious composition is a composition that contains carbonates, e.g., calcium carbonates that are characterized by having a $\delta^{13}$C value less than −10‰. In some embodiments, the cementitious composition is a composition that contains carbonates, e.g., calcium carbonates that are characterized by having a $\delta^{13}$C value less than −15‰, such as −16‰, such as less than −20‰, such as −21‰, such as −22‰, such as −23‰, such as −24‰, such as less than −25‰. In some embodiments, the cementitious composition is a composition that contains organic matter or fossil fuel burning originated carbonates, that are characterized by having a $\delta^{13}$C value less than −10‰, such as less than −15‰, such as −16‰, such as less than −20‰, such as −21‰, such as −22‰, such as −23‰, such as −24‰, such as less than −25‰. In some embodiments, the cementitious composition is a composition that contains organic matter or fossil fuel burning originated carbonates, e.g., calcium carbonates that are characterized by having a $\delta^{13}$C value less than −10‰.

In some embodiments, the ratio of the calcium to carbonate ions may be varied to form the cementitious composition with desired surface charge. In some embodiments, the ratio of calcium or calcium ion with the carbonate or the carbonate ion in the cementitious composition (calcium:carbonate) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is in a range of 1.2:1 to 1.8:1; or is 1:1; or is 1.5:1; or is 2:1; or is 2.5:1; or is 3:1; or is 3.5:1; or is 4:1; or is 4.5:1; or is 5:1. In some embodiments, the ratio of calcium:carbonate in the cementitious composition is 1.5:1, or 1:1, or 2:1.

In some embodiments, the cementitious composition provided herein may further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the cementitious composition of the invention in un-derivatized form. In some embodiments, the cementitious composition provided herein may further include one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in a given composition of the invention may vary, and in certain embodiments the amounts of these components range from 0.1 to 1% w/w; or 1 to 50% w/w, or 10% w/w to 50% w/w, such as 2 to 10% w/w.

The carbonate compounds of the cementitious composition may be metastable carbonate compounds including, but not limited to, vaterite and/or amorphous calcium carbonate. The carbonate compound containing cementitious compositions of the invention may include precipitated crystalline and/or amorphous carbonate compounds. Specific carbonate minerals of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3 \cdot nH_2O$). Magnesium carbonate minerals of interest include, but are not limited to: magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$) and amorphous magnesium calcium carbonate ($MgCO_3 \cdot nH_2O$). Calcium magnesium carbonate minerals of interest include, but are not limited to dolomite ($CaMgCO_3$), huntite ($CaMg_3(CO_3)_4$) and sergeevite ($Ca_2Mg_{11}(CO_3)_{13} \cdot H_2O$). In certain embodiments, non-carbonate compounds like brucite ($Mg(OH)_2$) may also form in combination with the minerals listed above. As indicated above, the compounds of the carbonate compound compositions are metastable carbonate compounds (and may include one or more metastable hydroxide compounds) that are more stable in saltwater than in freshwater, such that upon contact with fresh water of any pH they dissolve and re-precipitate into other fresh water stable compounds, e.g., minerals such as low-Mg calcite.

Calcium carbonate in the cementitious composition in addition to vaterite may include, but not limited to: a precursor phase of vaterite, a precursor phase of aragonite, an intermediary phase that is less stable than calcite, polymorphic forms in between these polymorphs, and combination thereof. Vaterite may be present in the cementitious composition in a monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite may comprise nanoclusters of vaterite and the precursor form of aragonite may comprise sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The compositions provided herein show unexpected properties, such as, high compressive strength, high durability, and less maintenance costs. In addition, in some embodiments, when the $CO_2$ is sequestered from flue gas or from carbonated brines into the calcium carbonate forms of the invention, it reduces carbon footprint and provides cleaner environment. In some embodiments, the compositions upon combination with water, setting, and hardening, have a compressive strength of at least 14 MPa (megapascal) or in some embodiments, between 14-80 MPa or 14-35 MPa. In some embodiments, the vaterite containing compositions provided herein are formed from $CO_2$ source that has a fossil fuel origin. Accordingly, in some embodiments, the compositions provided herein have a carbon isotopic fractionation value ($\delta^{13}C$) of less than −12‰. In some embodiments, the compositions of the invention are non-medical or are not for medical procedures. In some embodiments, the compositions of the invention are synthetic compositions and are not naturally occurring.

In some embodiments of the aspects and embodiments described herein, the cementitious compositions provided herein includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 95% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 30% w/w to 99% w/w vaterite; or from 30% w/w to 95% w/w vaterite; or from 30% w/w to 90% w/w vaterite; or from 30% w/w to 80% w/w vaterite; or from 30% w/w to 70% w/w vaterite; or from 30% w/w to 60% w/w vaterite; or from 30% w/w to 50% w/w vaterite; or from 30% w/w to 40% w/w vaterite; or from 50% w/w to 99% w/w vaterite; or from 50% w/w to 95% w/w vaterite; or from 50% w/w to 90% w/w vaterite; or from 50% w/w to 80% w/w vaterite; or from 50% w/w to 70% w/w vaterite; or from 50% w/w to 60% w/w vaterite; or from 70% w/w to 99% w/w vaterite; or from 70% w/w to 95% w/w vaterite; or from 70% w/w to 90% w/w vaterite; or from 70% w/w to 80% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or from 90% w/w to 95% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite.

In some embodiments of the aspects and the embodiments described herein and above, the cementitious composition includes at least 1% w/w amorphous calcium carbonate (ACC); or at least 2% w/w ACC; or at least 5% w/w ACC; or at least 10% w/w ACC; or at least 50% w/w ACC; or at least 80% w/w ACC; or at least 90% w/w ACC; or from 1% w/w to 90% w/w ACC; or from 1% w/w to 80% w/w ACC; or from 1% w/w to 70% w/w ACC; or from 1% w/w to 60% w/w ACC; or from 1% w/w to 50% w/w ACC; or from 1% w/w to 40% w/w ACC; or from 1% w/w to 30% w/w ACC; or from 1% w/w to 20% w/w ACC; or from 1% w/w to 10% w/w ACC; or from 5% w/w to 90% w/w ACC; or from 5% w/w to 80% w/w ACC; or from 5% w/w to 70% w/w ACC; or from 5% w/w to 60% w/w ACC; or from 5% w/w to 50% w/w ACC; or from 5% w/w to 40% w/w ACC; or from 5% w/w to 30% w/w ACC; or from 5% w/w to 20% w/w ACC; or from 5% w/w to 10% w/w ACC; or from 10% w/w to 90% w/w ACC; or from 10% w/w to 80% w/w ACC; or from 10% w/w to 70% w/w ACC; or from 10% w/w to 60% w/w ACC; or from 10% w/w to 50% w/w ACC; or from 10% w/w to 40% w/w ACC; or from 10% w/w to 30% w/w ACC; or from 10% w/w to 20% w/w ACC; or from 30% w/w to 90% w/w ACC; or from 30% w/w to 80% w/w ACC; or from 30% w/w to 70% w/w ACC; or from 30% w/w to 60% w/w ACC; or from 30% w/w to 50% w/w ACC; or from 30% w/w to 40% w/w ACC; or from 50% w/w to 90% w/w ACC; or from 50% w/w to 80% w/w ACC; or from 50% w/w to 70% w/w ACC; or from 50% w/w to 60% w/w ACC; or from 70% w/w to 90% w/w ACC; or from 70% w/w to 80% w/w ACC; or from 70% w/w to 75% w/w ACC; or 1% w/w ACC; or 2% w/w ACC; or 5% w/w ACC; or 10% w/w ACC; or 20% w/w ACC; or 30% w/w ACC; or 40% w/w ACC; or 50% w/w ACC; or 60% w/w ACC; or 70% w/w ACC; or 80% w/w ACC; or 90% w/w ACC.

In some embodiments of the aspects and the embodiments described herein, the cementitious composition includes the vaterite in a range of 10% w/w to 99% w/w and the ACC in a range of 1% w/w to 90% w/w; or the vaterite is in a range of 10% w/w to 90% w/w and the ACC is in a range of 10% w/w to 90% w/w; or the vaterite is in a range of 10% w/w to 80% w/w and the ACC is in a range of 20% w/w to 90% w/w; or the vaterite is in a range of 10% w/w to 70% w/w and the ACC is in a range of 30% w/w to 90% w/w; or the vaterite is in a range of 10% w/w to 60% w/w and the ACC is in a range of 40% w/w to 90% w/w; or the vaterite is in a range of 10% w/w to 50% w/w and the ACC is in a range of 50% w/w to 90% w/w; or the vaterite is in a range of 10% w/w to 40% w/w and the ACC is in a range of 60% w/w to 90% w/w; or the vaterite is in a range of 10% w/w to 30% w/w and the ACC is in a range of 70% w/w to 90% w/w; or the vaterite is in a range of 10% w/w to 20% w/w and the ACC is in a range of 80% w/w to 90% w/w. It is to be understood that the percentage of each of the components in the composition will be in such a way that the total percentage of the components in the composition may not exceed a total of 100% by wt.

In some embodiments of the aspects and the embodiments described herein, the compositions of the invention after setting, and hardening have a compressive strength of at least 14

MPa; or at least 16 MPa; or at least 18 MPa; or at least 20 MPa; or at least 25 MPa; or at least 30 MPa; or at least 35 MPa; or at least 40 MPa; or at least 50 MPa; or at least 60 MPa; or at least 70 MPa; or at least 80 MPa; or at least 90 MPa; or at least 100 MPa; or from 14-100 MPa; or from 14-80 MPa; or from 14-75 MPa; or from 14-70 MPa; or from 14-65 MPa; or from 14-60 MPa; or from 14-55 MPa; or from 14-50 MPa; or from 14-45 MPa; or from 14-40 MPa; or from 14-35 MPa; or from 14-30 MPa; or from 14-25 MPa; or from 14-20 MPa; or from 14-18 MPa; or from 14-16 MPa; or from 20-100 MPa; or from 20-90 MPa; or from 20-80 MPa; or from 20-75 MPa; or from 20-70 MPa; or from 20-65 MPa; or from 20-60 MPa; or from 20-55 MPa; or from 20-50 MPa; or from 20-45 MPa; or from 20-40 MPa; or from 20-35 MPa; or from 20-30 MPa; or from 20-25 MPa; or from 30-100 MPa; or from 30-75 MPa; or from 30-50 MPa; or from 50-100 MPa; or from 50-75 MPa; or from 60-90 MPa; or from 70-100 MPa; or from 80-90 MPa; or 14 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening has a compressive strength of 14 MPa to 40 MPa; or 17 MPa to 40 MPa; or 20 MPa to 40 MPa; or 30 MPa to 40 MPa; or 35 MPa to 40 MPa.

In some embodiments, the compressive strengths described herein are the compressive strengths after 1 day, or 3 days, or 7 days, or 28 days, or 56 days, or longer. For example, in some embodiments, the cementitious composition or the composition containing the cementitious composition of the invention after setting, and hardening have a compressive strength between 14-55 MPa after 1 day. In some embodiments, the cementitious composition or the composition containing the cementitious composition of the invention, after setting, and hardening have a compressive strength between 14-55 MPa after 7 days. In some embodiments, the cementitious composition or the composition containing the cementitious composition of the invention, after setting, and hardening have a compressive strength between 14-55 MPa after 28 days.

In some embodiments of the aspects and the embodiments, the cementitious composition has a $\delta^{13}C$ of less than −12‰; or less than −13‰; or less than −14‰; or less than −15‰; or less than −16‰; or less than −17‰; or less than −18‰; or less than −19‰; or less than −20‰; or less than −21‰; or less than −22‰; or less than −25‰; or less than −30‰; or less than −40‰; or less than −50‰; or less than −60‰; or less than −70‰; or less than −80‰; or less than −90‰; or less than −100‰; or from −12‰ to −80‰; or from −12‰ to −70‰; or from −12‰ to −60‰; or from −12‰ to −50‰; or from −12‰ to −45‰; or from −12‰ to −40‰; or from −12‰ to −35‰; or from −12‰ to −30‰; or from −12‰ to −25‰; or from −12‰ to −20‰; or from −12‰ to −15‰; or from −13‰ to −80‰; or from −13‰ to −70‰; or from −13‰ to −60‰; or from −13‰ to −50‰; or from −13‰ to −45‰; or from −13‰ to −40‰; or from −13‰ to −35‰; or from −13‰ to −30‰; or from −13‰ to −25‰; or from −13‰ to −20‰; or from −13‰ to −15‰; from −14‰ to −80‰; or from −14‰ to −70‰; or from −14‰ to −60‰; or from −14‰ to −50‰; or from −14‰ to −45‰; or from −14‰ to −40‰; or from −14‰ to −35‰; or from −14‰ to −30‰; or from −14‰ to −25‰; or from −14‰ to −20‰; or from −14‰ to −15‰; or from −15‰ to −80‰; or from −15‰ to −70‰; or from −15‰ to −60‰; or from −15‰ to −50‰; or from −15‰ to −45‰; or from −15‰ to −40‰; or from −15‰ to −35‰; or from −15‰ to −30‰; or from −15‰ to −25‰; or from −15‰ to −20‰; or from −16‰ to −80‰; or from −16‰ to −70‰; or from −16‰ to −60‰; or from −16‰ to −50‰; or from −16‰ to −45‰; or from −16‰ to −40‰; or from −16‰ to −35‰; or from −16‰ to −30‰; or from −16‰ to −25‰; or from −16‰ to −20‰; or from −20‰ to −80‰; or from −20‰ to −70‰; or from −20‰ to −60‰; or from −20‰ to −50‰; or from −20‰ to −40‰; or from −20‰ to −35‰; or from −20‰ to −30‰; or from −20‰ to −25‰; or from −30‰ to −80‰; or from −30‰ to −70‰; or from −30‰ to −60‰; or from −30‰ to −50‰; or from −30‰ to −40‰; or from −40‰ to −80‰; or from −40‰ to −70‰; or from −40‰ to −60‰; or from −40‰ to −50‰; or from −50‰ to −80‰; or from −50‰ to −70‰; or from −50‰ to −60‰; or from −60‰ to −80‰; or from −60‰ to −70‰; or from −70‰ to −80‰; or −12‰; or −13‰; or −14‰; or −15‰; or −16‰; or −17‰; or −18‰; or −19‰; or −20‰; or −21‰; or −22‰; or −25‰; or −30‰; or −40‰; or −50‰; or −60‰; or −70‰; or −80‰; or −90‰; or −100‰.

In some embodiments, the cementitious composition provided herein is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the cement yet providing smaller reactive particles for early reaction. In such instances, the average particle size of the larger size class can be upwards of 1000 microns (1 mm). In some embodiments, the cementitious composition provided herein is a particulate composition with an average particle size of 0.1-1000 microns; or 0.1-500 microns; or 0.1-200 microns; or 0.1-100 microns; or 0.1-80 microns; or 0.1-50 microns; or 0.1-40 microns; or 0.1-30 microns; or 0.1-20 microns; or 0.1-10 microns; or 0.1-5 microns; or 0.5-100 microns; or 0.5-70 microns; or 0.5-50 microns; or 0.5-10 microns; or 0.5-5 microns; or 1-100 microns; or 1-70 microns; or 1-50 microns; or 1-10 microns; or 1-5 microns; or 3-100 microns; or 3-50 microns; or 3-10 microns; or 3-8 microns; or 5-100 microns; or 5-50 microns; or 5-10 microns; or 5-8 microns; or 8-100 microns; or 8-50 microns; or 8-30 microns; or 8-20 microns; or 8-10 microns; or 10-100 microns; or 10-50 microns; or 10-30 microns; or 20-100 microns; or 20-50 microns; or 20-40 microns; or 40-100 microns; or 40-50 microns; or 50-100 microns; or 50-70 microns; or 60-100 microns; or 60-70 microns; or 70-100 microns; or 80-100 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition provided herein is a particulate composition with an average particle size of 0.1-30 micron; 0.1-20 micron; or 0.1-15 micron; or 0.1-10 micron; or 0.1-8 micron; or 0.1-5 micron; or 1-5 micron; or 5-10 micron.

In certain embodiments, the composition provided herein may further include an aggregate. Aggregate may be included in the composition to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

It is to be understood that all the wt % s or vol % s in the compositions do not exceed 100 wt % or vol % of the total composition.

In some embodiments, the cementitious composition of the invention may further include Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition may include a blend of 75% OPC and 25% composition of the invention; or 80% OPC and 20% composition of the invention; or 85% OPC and 15% composition of the invention; or 90% OPC and 10% composition of the invention; or 95% OPC and 5% composition of the invention.

The cementitious composition of the invention may be derived from, e.g., precipitated from, absorbing solution and/or water. As the $CO_2$ sequestering products are precipitated from water, they may include one or more additives that are present in the water from which they are derived. For example, where the water is salt water, the cementitious composition may include one or more compounds found in the salt water source. These compounds may be used to identify the solid precipitations of the compositions that come from the salt water source, where these identifying components and the amounts thereof are collectively referred to herein as a saltwater source identifier. For example, if the saltwater source is sea water, identifying compounds that may be present in the precipitated solids of the compositions include, but are not limited to: chloride, sodium, sulfur, potassium, bromide, silicon, strontium and the like. Any such source-identifying or "marker" elements would generally be present in small amounts, e.g., in amounts of 20,000 ppm or less, such as amounts of 2000 ppm or less. In certain embodiments, the "marker" compound is strontium, which may be present in the precipitated incorporated into the aragonite lattice, and make up 10,000 ppm or less, ranging in certain embodiments from 3 to 10,000 ppm, such as from 5 to 5000 ppm, including 5 to 1000 ppm, e.g., 5 to 500 ppm, including 5 to 100 ppm. Another "marker" compound of interest is magnesium, which may be present in amounts of up to 20% mole substitution for calcium in carbonate compounds. The saltwater source identifier of the compositions may vary depending on the particular saltwater source employed to produce the saltwater-derived carbonate composition. Also of interest are isotopic markers that identify the water source.

The cementitious composition of the invention may be viewed as low-carbon footprint compositions. Low-carbon footprint compositions have a reduced carbon footprint as compared to corresponding compositions that lack the $CO_2$ sequestering (where "corresponding" herein means the identical composition but for the presence of the $CO_2$ sequestering as in the cementitious composition of the invention). Using any convenient carbon footprint calculator, the magnitude of carbon footprint reduction of the compositions of the invention as compared to corresponding compositions that lack the $CO_2$ sequestering may be 5% or more, such as 10% or more, including 25%, 50%, 75% or even 100% or more. In certain embodiments, the low-carbon footprint cementitious compositions of the invention are carbon neutral, in that they have substantially no, if any, calculated carbon footprint, e.g., as determined using any convenient carbon footprint calculator that is relevant for a particular composition of interest. Carbon neutral compositions of the invention include those compositions that exhibit a carbon footprint of 50 lbs $CO_2$/cu yd material or less, such as 10 lbs $CO_2$/cu yd material or less, including 5 lbs $CO_2$/cu yd material or less, where in certain embodiments the carbon neutral compositions have 0 or negative lbs $CO_2$/cu yd material, such as negative 1 or more, e.g., negative 3 or more lbs $CO_2$/cu yd material. In some instances, the low carbon footprint compositions have a significantly negative carbon footprint, e.g., −100 or more lbs $CO_2$/cu yd or less.

C. Products

In one aspect, there are provided building materials comprising the cementitious composition of the invention. In one aspect, there is provided a building material formed from the cementitious composition of the invention. In one aspect, there is provided a method of making a composition, comprising a) contacting an industrial waste gas stream comprising carbon dioxide with an alkaline solution to form a carbon dioxide charged water; b) contacting the carbon dioxide charged water with calcium sulfate to form a composition comprising a metastable component selected from the group consisting of vaterite, amorphous calcium carbonate, and combination thereof; and c) mixing the composition with water forming a building material. One or more precipitation conditions, described herein, may be used to favor the formation of the metastable component in the composition. Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof. Since these structures or building materials comprise and/or are produced from the compositions of the invention, they may include markers or components that identify them as being obtained from carbon dioxide of fossil fuel origin ($\delta^{13}C$ value) and/or being obtained from water having trace amounts of various elements present in the initial salt water source, as described herein.

In one aspect, there are provided formed building materials comprising the cementitious composition of the invention. In some embodiments, the formed building material is formed from the compositions of the invention. In one aspect, there is provided a method of making a composition, comprising a) contacting an industrial waste gas stream comprising carbon dioxide with an alkaline solution to form a carbon dioxide charged water; b) contacting the carbon dioxide charged water with calcium sulfate to form a composition comprising a metastable component selected from the group consisting of vaterite, amorphous calcium carbonate, and combination thereof; and c) mixing the composition with water and pouring the composition in a mold to form a formed building material. One or more precipitation conditions, described herein, may be used to favor the formation of the metastable component in the composition. The formed building material may be a pre-cast building material, such as, a pre-cast concrete product. The formed building materials and the methods of making and using the formed building materials are described in U.S. application Ser. No. 12/571,398, filed Sep. 30, 2009, which is incorporated herein by reference in its entirety. The formed building materials of the invention may vary greatly and include materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition of the invention is employed in making such materials. In some embodiments, the formed building materials made from the composition of the invention have a compressive strength of at least 14 MPa; or between about 14-100 MPa; or between about 14-45 MPa; or the compressive strength of the composition of the invention after setting, and hardening, as described herein. In some embodiments, the formed building materials made from the composition of the invention have a $\delta^{13}C$ of less than −12‰; or less than −13‰; or less than −14‰; or less than −15‰; or from −15‰ to −80‰; or the $\delta^{13}C$ of the composition of the invention, as described herein.

In one aspect, there are provided methods to form formed building materials comprising mixing cementitious composition of the invention with water and pouring the wet composition in a mold to form formed building material. In some embodiments, the wet composition includes less than 90% by wt solid material; or less than 80% by wt solid material; or less than 70% by wt solid material; or less than 60% by wt solid material; or less than 50% by wt solid material; or less than 40% by wt solid material; or less than 30% by wt solid material; or less than 20% by wt solid material; or less than 10% by wt solid material; or between 10-99% by wt solid material; or between 10-90% by wt solid material; or between 10-80% by wt solid material; or between 10-70% by wt solid material; or between 10-50% by wt solid material; or between 10-30% by wt solid material; or between 40-90% by wt solid material; or between 50-90% by wt solid material.

One example of the formed building materials is masonry units. Masonry units are formed building materials used in the construction of load-bearing and non-load-bearing structures that are generally assembled using mortar, grout, and the like. Exemplary masonry units formed from the compositions of the invention include bricks, blocks, and tiles. Bricks and blocks of the invention are polygonal structures possessing linear dimensions. Bricks are masonry units with dimensions (mm) not exceeding 337.5×225×112.5 (length×width×height). Any unit with dimensions (mm) between 337.5×225×112.5 to 2000×1000×500 (length×width×depth) is termed a "block." Structural units with dimensions (mm) exceeding 2000×1000×500 (length×width×depth) are termed "slabs." Tiles refer to masonry units that possess the same dimensions as bricks or blocks, but may vary considerably in shape, i.e., may not be polygonal (e.g., hacienda-style roof tiles).

One type of masonry unit provided by the invention is a brick, which refers to a structural unit of material used in masonry construction, generally laid using mortar. Bricks formed from the compositions of the invention are masonry units with dimensions (mm) not exceeding 337.5×225×112.5 (length×width×height). In some embodiments, the bricks may have lengths ranging from 175 to 300 mm, such as 200 to 250 mm, including 200 to 230 mm; widths ranging from 75 to 150 mm, such as 100 to 120 mm, including 100 to 110 mm; and heights ranging from 50 to 90 mm, such as 50 to 80 mm, including 55 to 75 mm Bricks may vary in grade, class, color, texture, size, weight and can be solid, cellular, perforated, frogged, or hollow. Bricks formed from the compositions of the invention may include, but are not limited to, building brick, facing brick, load bearing brick, engineering brick, thin veneer brick, paving brick, glazed brick, firebox brick, chemical resistant brick, sewer and manhole brick, industrial floor brick, etc. The bricks may also vary in frost resistance (i.e., frost resistant, moderately frost resistant or non frost resistant), which relates to the durability of bricks in conditions where exposure to water may result in different levels of freezing and thawing. Frost resistant bricks are durable in conditions of constant exposure to water and freezing and thawing. Moderately frost resistant bricks are durable in conditions of sporadic exposure to water and freezing and thawing. Non-frost resistant bricks are not durable in conditions of exposure to water and freezing and thawing. These bricks are suitable only for internal use and are liable to damage by freezing and thawing except when protected by an impermeable cladding during construction. Bricks formed from the compositions of the invention may also vary in soluble salt content (i.e., low or normal). Percentage by mass of soluble ions in bricks with a low soluble salt content does not exceed 0.03% magnesium, 0.03% potassium, 0.03% sodium, and 0.5% sulfate. Percentage by mass of soluble ions in bricks with a normal salt content does not exceed 0.25% of magnesium, potassium, and sodium in total and sulfate content does not exceed 1.6%. The bricks may vary considerably in physical and mechanical properties. The compressive strength of bricks formed from the compositions of the invention may range, in certain instances, from 5 to 100 MPa; or 20-100 MPa; or 50-100 MPa; or 80-100 MPa; or 20-80 MPa; or 20-40 MPa; or 60-80 MPa.

The flexural strength of bricks formed from the compositions of the invention may vary, ranging from 0.5 to 10 MPa, including 2 to 7 MPa, such as 2 to 5 MPa. The maximum water absorption of bricks may vary, ranging from 5 to 25%, including 10 to 15%. Bricks formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.2%, including 0.05 to 0.1%. In some embodiments, the bricks may be used for paving a road. Bricks used to pave areas exposed to heavy traffic (e.g., pedestrian, vehicular, etc.) may have an abrasion resistance index ranging from 0.1 to 0.5, including 0.2 to 0.4, such as 0.3. In addition, bricks formed from the compositions of the invention may have a volume abrasion loss ranging from 1.0 to 4.0 cm$^3$/cm$^2$, including 1.5 to 2.5 cm$^3$/cm$^2$, or 2.0 cm$^3$/cm$^2$. The composition of the invention may be molded, extruded, or sculpted into the desired shape and size to form a brick. The shaped composition is then dried and further hardened by hydraulic pressure, autoclave or fired in a kiln at temperatures ranging between 900° to 1200° C., such as 900° to 1100° C. and including 1000° C.

Another type of masonry unit provided by the invention is blocks, (e.g., concrete, cement, foundation, etc.). Blocks are distinct from bricks based on their structural dimensions. Specifically, blocks exceed the dimensions (mm) of 337.5× 225×112.5 (length×width×height). Blocks formed from the compositions of the invention may vary in color, texture, size, and weight and can be solid, cellular, and hollow or employ insulation (e.g., expanded polystyrene foam) in the block void volume. Blocks may be load-bearing, non-load-bearing or veneer (i.e., decorative) blocks. In some embodiments, the blocks may have lengths ranging from 300 to 500 mm, such as 350 to 450 mm, widths ranging from 150 to 250 mm, such as 180 to 215 mm and heights ranging from 100 to 250 mm, such as 150 to 200 mm. The blocks may also vary in faceshell thickness. In some instances, the blocks may have faceshell thicknesses ranging from 15 to 40 mm, including 20 to 30 mm, such as 25 mm The blocks may also vary in web thickness. In some embodiments, the blocks may have web thicknesses ranging from 15 to 30 mm, including 15 to 25 mm, such as 20 mm. The blocks formed from the compositions of the invention may vary considerably in physical and mechanical properties. The compressive strength of blocks may vary, in certain instances ranging from 5 to 100 MPa, including 15 to 75 MPa, such as 20 to 40 MPa. The flexural strength of blocks formed from the compositions of the invention may also vary, ranging from 0.5 to 15 MPa, including 2 to 10 MPa, such as 4 to 6 MPa. The maximum water absorption of the blocks may vary, ranging from 7 to 20% by weight including 8 to 15%, such as 9 to 11%. Blocks formed from the compositions of the invention may also undergo moisture movement (expansion or contraction) due to the absorption or loss of water to its environment. Blocks may be Type I moisture-controlled units or Type II non-moisture-controlled units. The dimensional stability (i.e., linear shrinkage) of the blocks formed from the compositions of the invention may vary depending on their intended use and/or geographical location of use, in certain instances ranging from 0.02 to 0.15%, such as 0.03 to 0.05%. The composition of the invention may be molded, extruded, or sculpted into the desired shape and size to form a block. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight concrete block. The composition is further cured in an environment with a controlled temperature and humidity.

Another type of building material provided by the invention is a tile. Tiles formed from the compositions of the invention refer to non-load-bearing building materials that are commonly employed on roofs and to pave exterior and interior floors of commercial and residential structures. Some examples where tiles may be employed include, but are not limited to, the roofs of commercial and residential buildings, decorative patios, bathrooms, saunas, kitchens, building foyer, driveways, pool decks, porches, walkways, sidewalks, and the like. Tiles may take on many forms depending on their intended use and/or intended geographical location of use, varying in shape, size, weight, and may be solid, webbed, cellular or hollow. Tiles formed from the compositions of the invention may vary in dimension, e.g., lengths ranging from 100 to 1000 mm, including 250 to 500 mm, such as 250 to 300 mm; widths ranging from 50 to 1000 mm, including 100 to 250 mm, such as 125 to 175 mm; and thickness ranging from 10 to 30 mm, including 15 to 25 mm, such as 15 to 20 mm. The compressive strengths of tiles formed from the compositions of the invention may also vary, in certain instances ranging from 5 to 75 MPa, including 15 to 40 MPa, such as 25 MPa. The flexural strength of tiles formed from the compositions of the invention may vary, ranging from 0.5 to 7.5 MPa, including 2 to 5 MPa, such as 2.5 MPa. The maximum water absorption of tiles may also vary, in certain instances ranging from 5 to 15%, including 7 to 12%. Tiles of the invention may also undergo moisture movement (expansion or contraction) due to the absorption or loss of water to its environment. The dimensional stability (i.e., linear shrinkage or expansion) due to moisture movement may vary, in certain instances ranging from 0.001 to 0.25%, including 0.025 to 0.075%, such as 0.05%. Tiles used to pave areas exposed to heavy traffic (e.g., pedestrian, vehicular, etc.) may have an abrasion resistance index that may vary considerably, ranging from 0.1 to 0.5, including 0.25. In addition, tiles may have a volume abrasion loss ranging from 1.0 to 4.0 $cm^3/cm^2$, including 1.5 to 3.0 $cm^3/cm^2$, such as, 2.7 $cm^3/cm^2$. Tiles may be polygonal, circular or take on any other desired shape.

As such, the composition of the invention may be molded or cast into the desired tile shape and size. The shaped composition may be further compacted by roller compaction, hydraulic pressure, vibrational compaction, or resonant shock compaction. The resultant composition may also be poured out into sheets or a roller may be used to form sheets of a desired thickness. The sheets are then cut to the desired dimensions of the tiles. In some instances, the resultant composition may also be foamed using mechanically or chemically introduced gases prior to being shaped or while the composition is setting in order to form a lightweight tile. The shaped composition is then allowed to set and further cured in an environment with a controlled temperature and humidity. Tiles may be further polished, colored, textured, shot blasted, inlaid with decorative components and the like.

Construction panels are formed building materials employed in a broad sense to refer to any non-load-bearing structural element that are characterized such that their length and width are substantially greater than their thickness. Exemplary construction panels formed from the compositions of the invention include cement boards, fiber-cement sidings, and drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm. Cement boards comprise construction panels conventionally prepared as a combination of cement and fiberglass and possess additional fiberglass reinforcement at both faces of the board. Fiber-cement sidings comprise construction panels conventionally prepared as a combination of cement, aggregate, interwoven cellulose, and/or polymeric fibers and possess a texture and flexibility that resembles wood. Drywall comprises construction panels conventionally prepared from gypsum plaster (i.e., semi-hydrous form of calcium sulfate), fibers (glass or paper) and is sandwiched between two sheets of outer material, e.g., paper or fiberglass mats.

One type of construction panel formed from the compositions of the invention is cement board. They are formed building materials where in some embodiments, are used as backer boards for ceramics that may be employed behind bathroom tiles, kitchen counters, backsplashes, etc. and may have lengths ranging from 100 to 200 cm, such as 125 to 175 cm, e.g., 150 to 160 cm; a breadth ranging from 75 to 100 cm, such as 80 to 100 cm, e.g., 90 to 95 cm, and a thickness ranging from 5 to 25 mm, e.g., 5 to 15 mm, including 5 to 10 mm Cement boards of the invention may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments of the invention, cement boards may be employed in environments having extensive exposure to moisture (e.g., commercial saunas). The maximum water absorption of the cement boards of the invention may vary, ranging from 5 to 15% by weight, including 8 to 10%, such as 9%. Cement boards formed from the compositions of the invention may also undergo moisture movement (expansion or contraction) due to the absorption or loss of water to its environment. The dimensional stability (i.e., linear shrinkage or expansion) due to moisture movement may vary, in certain instances ranging from 0.035 to 0.1%, including 0.04 to 0.08%, such as 0.05 to 0.06%. The composition of the invention may be used to produce the desired shape and size to form a cement board. In addition, a variety of further components may be added to the cement boards which include, but are not limited to, plasticizers, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards. In some instances, the resultant composition may also be foamed using mechanically or chemically introduced gases prior to being shaped or while the composition is setting in order to form a lightweight cement board. The shaped composition is then allowed to set and further cured in an environment with a controlled temperature and humidity. The cement boards formed from the compositions of the invention then may be covered in a fiberglass mat on both faces of the board. Where desired, the cement boards formed from the compositions of the invention may also be prepared using chemical admixtures such that they possess increased fire, water, and frost resistance as well as resistance to damage by bio-degradation and corrosion. The cement board may also be combined with components such as dispersed glass fibers, which may impart improved durability, increased flexural strength, and a smoother surface.

Another type of construction panel provided by the invention is fiber-cement siding. Fiber-cement sidings formed from the compositions of the invention are formed building materials used to cover the exterior or roofs of buildings and include, but are not limited to, building sheets, roof panels, ceiling panels, eternits, and the like. They may also find use as a substitute for timber fascias and barge boards in high fire areas. Fiber-cement sidings may have dimensions that vary, ranging from 200 to 400 cm in length, e.g., 250 cm and 50 to 150 cm in width, e.g., 100 cm and a thickness ranging from 4 to 20 mm, e.g., 5 to 15 mm, including 10 mm Fiber-cement sidings formed from the compositions of the invention may possess physical and mechanical properties that vary. In some embodiments, the flexural strength may range between 0.5 to 5 MPa, including 1 to 3 MPa, such as 2 MPa. The compressive strengths may also vary, in some instances ranging from 2 to 25 MPa, including 10 to 15 MPa, such as 10 to 12 MPa. In some embodiments of the invention, fiber-cement sidings may be employed on buildings that are subject to varying weather conditions, in some embodiments ranging from extremely arid to wet (i.e., low to high levels of humidity). Accordingly, the maximum water absorption of the fiber-cement sidings of the invention may vary, ranging from 10 to 25% by mass, including 10 to 20%, such as 12 to 15%. The dimensional stability (i.e., linear shrinkage or expansion) due to moisture movement may vary, in certain instances ranging from 0.05 to 0.1%, including 0.07 to 0.09%. The composition of the invention may be used to produce the desired shape and size to form a fiber-cement siding. In addition, a variety of further components may be added to the fiber-cement sidings which include, but are not limited to, cellulose fibers, plasticizers, foaming agents, accelerators, retarders and air entrainment additives. The composition is then poured into sheet molds or a roller is used to form sheets of a desired thickness. The shaped composition may be further compacted by roller compaction, hydraulic pressure, vibrational compaction, or resonant shock compaction. The sheets are then cut to the desired dimensions of the fiber-cement sidings. In some instances, the resultant composition may also be foamed using mechanically or chemically introduced gases prior to being shaped or while the composition is setting in order to form a lightweight fiber-cement siding. The shaped composition is then allowed to set and further cured in an environment with a controlled temperature and humidity. The fiber-cement sidings of the invention may then be covered with a polymeric film, enamel or paint. Where desired, the fiber-cement sidings formed from the compositions of the invention may also be prepared using chemical admixtures such that they possess increased fire, water, and frost resistance as well as resistance to damage by bio-degradation and corrosion.

Another type of construction panel formed from the compositions of the invention is drywall. The term drywall refers to the commonly manufactured building material that is used to finish construction of interior walls and ceilings. In certain instances, drywall building materials are panels that are made of a paper liner wrapped around an inner core. The inner core of drywall of the invention will include at least some amount of the composition of the invention. The dimensions of the drywall building materials of the invention may vary, in certain instances ranging from 100 to 200 cm, such as 125 to 175 cm, e.g., 150 to 160 cm in length; ranging from 75 to 100 cm, such as 80 to 100 cm, e.g., 90 to 95 cm in breadth, and ranging from 5 to 50 mm, e.g., 5 to 30 mm, including 10 to 25 mm in thickness. Drywall provided by the invention may possess physical and mechanical properties that vary considerably, and may depend upon the amount of the conventional constituents of drywall preparation that are replaced with the composition of the invention. The flexural and compressive strengths of drywall provided by the invention are generally larger than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. The maximum water absorption of drywall of the invention may vary, ranging from 2 to 10% by mass, including 4 to 8%, such as 5%. In certain embodiments, the inner core will be analogous to a conventional drywall core which is made primarily from gypsum plaster (the semi-hydrous form of calcium sulfate ($CaSO_4 \cdot \frac{1}{2}H_2O$), with at least a portion of the gypsum component replaced with the composition of the invention. In addition, the core may include a variety of further components, such as, but not limited to, fibers (e.g., paper and/or fiberglass), plasticizers, foaming agents, accelerators, e.g., potash, retarders, e.g., EDTA or other chelators, various additives that increase mildew and fire resistance (e.g., fiberglass or vermiculite), and water. The portion of components replaced with the composition of the invention may vary, and in certain instances is 5% by weight or more, including 10% by weight or more, 25% by weight or more, 50% by weight or more, 75% by weight or more, 90% by weight or more, or even 100% by weight. In producing the drywall, the core components may be combined and the resultant composition sandwiched between two sheets of outer material, e.g., heavy paper or fiberglass mats. When the core sets and is dried in a large drying chamber, the sandwich becomes rigid and strong enough for use as a building material.

Another building material formed from the compositions of the invention is a conduit. Conduits are tubes or analogous structures configured to convey a gas or liquid, from one location to another. Conduits of the invention can include any of a number of different structures used in the conveyance of a liquid or gas that include, but are not limited to, pipes, culverts, box culverts, drainage channels and portals, inlet structures, intake towers, gate wells, outlet structures, and the like. Conduits of the invention may vary considerably in shape, which is generally determined by hydraulic design and installation conditions. Shapes of conduits of the invention may include, but are not limited to circular, rectangular, oblong, horseshoe, square, etc. Multiple cell configurations of conduits are also possible. Conduit design may vary depending on its intended use. As such, conduits formed from the compositions of the invention may have dimensions that vary considerably. Conduits may have outer diameters which range in length from 5 to 500 cm or longer, such as 10 to 300 cm, e.g., 25 to 250 cm. The wall thicknesses may vary considerably, ranging in certain instances from 0.5 to 25 cm or thicker, such as 1 to 15 cm, e.g., 1 to 10 cm. In certain embodiments, conduits may be designed in order to support high internal pressure from water flow within the conduit. In yet other embodiments, conduits formed from the compositions of the invention may be designed to support high external loadings (e.g., earth loads, surface surcharge loads, vehicle loads, external hydrostatic pressures, etc.). Accordingly, the compressive strength of the walls of conduits of the invention may also vary, depending on the size and intended use of the conduit, in some instances ranging, from 5 to 75 MPa, such as 10 to 50 MPa, e.g., 15 to 40 MPa. Where desired, the conduits may be employed with various coatings or liners (e.g., polymeric), and may be configured for easy joining with each other to produce long conveyance structures made up of multiple conduits of the invention. In producing conduits of the invention, the composition after combining with water is poured into a mold in order to form the desired conduit shape and size. The shaped composition may be further compacted by roller compaction, hydraulic pressure, vibrational compaction, or resonant shock compaction. In some instances, the resultant composition may also be foamed using mechanically or chemically introduced gases prior to being shaped or while the composition is setting in order to form a lightweight conduit structure. The shaped composition is further allowed to set and is cured in an environment with a controlled temperature and humidity. In addition, the conduits of the invention may include a variety of further components, such as, but not limited to, plasticizers, foaming agents, accelerators, retarders and air entrainment additives. Where desired, the further components may include chemical admixtures such that the conduits of the invention possess increased resistance to damage by bio-degradation, frost, water, fire and corrosion. In some embodiments, the conduits formed from the compositions of the invention may employ structural support components such as, but not limited to, cables, wires and mesh composed of steel, polymeric materials, ductile iron, aluminum or plastic.

Another building material formed from the compositions of the invention is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc. Basins may vary in shape, size, and volume capacity. Basins may be rectangular, circular, spherical, or any other shape depending on its intended use. In some embodiments, basins may possess a greater width than depth, becoming smaller toward the bottom. The dimensions of the basin may vary depending on the intended use of the structure (e.g., from holding a few gallons of liquid to several hundred or several thousand or more gallons of liquid). The wall thicknesses may vary considerably, ranging in certain instances from 0.5 to 25 cm or thicker, such as 1 to 15 cm, e.g., 1 to 10 cm. Accordingly, the compressive strength may also vary considerably, depending on the size and intended use of the basin, in some instances ranging, from 5 to 60 MPa, such as 10 to 50 MPa, e.g., 15 to 40 MPa. In some embodiments, the basin may be designed to support high external loadings (e.g., earth loads, surface surcharge loads, vehicle loads, etc.). In certain other embodiments, the basins may be employed with various coatings or liners (e.g., polymeric), and may be configured so that they may be combined with conveyance elements (e.g., drainage pipe). In other embodiments, basins may be configured so that they may be connected to other basins so that they may form a connected series of basins. In producing basins, the composition after combining with water may be poured into a mold to form the desired basin shape and size. The shaped composition may be further compacted by roller compaction, hydraulic pressure, vibrational compaction, or resonant shock compaction. The basins may also be prepared by pouring the composition into sheet molds and the basins further assembled by combining the sheets together to form basins with varying dimensions (e.g., polygonal basins, rhomboidal basins, etc.). In some instances, the resultant composition may also be foamed using mechanically or chemically introduced gases prior to being shaped or while the composition is setting in order to form a lightweight basin structure. The shaped composition is further allowed to set and is cured in an environment with a controlled temperature and humidity. In addition, the basins formed from the compositions of the invention may include a variety of further components, such as, but not limited to, plasticizers, foaming agents, accelerators, retarders and air entrainment additives. Where desired, the further components may include chemical admixtures such that the basins of the invention possess increased resistance to damage by bio-degradation, frost, water, fire and corrosion. In some embodiments, the basins of the invention may employ structural support components such as, but not limited to, cables, wires and mesh composed of steel, polymeric materials, ductile iron, aluminum or plastic.

Another building material formed from the compositions of the invention is a beam, which, in a broad sense, refers to a horizontal load-bearing structure possessing large flexural and compressive strengths. Beams may be rectangular cross-shaped, C-channel, L-section edge beams, 1-beams, spandrel beams, H-beams, possess an inverted T-design, etc. Beams of the invention may also be horizontal load-bearing units, which include, but are not limited to joists, lintels, archways and cantilevers. Beams generally have a much longer length than their longest cross-sectional dimension, where the length of the beam may be 5-fold or more, 10-fold or more, 25-fold or more, longer than the longest cross-sectional dimension. Beams formed from the compositions of the invention may vary in their mechanical and physical properties. For example, unreinforced concrete beams may possess flexural capacities that vary, ranging from 2 to 25 MPa, including 5 to 15 MPa, such as 7 to 12 MPa and compressive strengths that range from 10 to 75 MPa, including 20 to 60 MPa, such as 40 MPa. Structurally reinforced concrete beams may possess considerably larger flexural capacities, ranging from 15 to 75 MPa, including as 25 to 50 MPa, such as 30 to 40 MPa and compressive strengths that range from 35 to 150 MPa, including 50 to 125 MPa, such as 75 to 100 MPa. The beams formed from the compositions of the invention may be internal or external, and may be symmetrically loaded or asymmetrically loaded. In some embodiments, beams may be composite, wherein it acts compositely with other structural units by the introduction of appropriate interface shear mechanisms. In other embodiments, beams may be non-composite, wherein it utilizes the properties of the basic beam alone. In producing beams of the invention, the composition of the invention after mixing with water may be poured into a beam mold or cast around a correlated steel reinforcing beam structure (e.g., steel rebar). In some embodiments, the steel reinforcement is pretensioned prior to casting the composition around the steel framework. In other embodiments, beams of the invention may be cast with a steel reinforcing cage that is mechanically anchored to the concrete beam. The beams of the invention may also employ additional structural support components such as, but not limited to cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the beams of the invention may include a variety of further components, such as but not limited to, plasticizers, foaming agents, accelerators, retarders and air entrainment additives. Where desired, the further components may include chemical admixtures such that the beams of the invention possess increased resistance to damage by biodegradation, frost, water, fire and corrosion.

Another building material formed from the compositions of the invention is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts. Columns formed from the compositions of the invention may be rigid, upright supports, composed of relatively few pieces. Columns may also be decorative pillars having a cylindrical or polygonal, smooth or fluted, tapered or straight shaft with a capital and usually a base, among other configurations. The capital and base of the column may have a similar shape as the column or may be different. Any combination of shapes for the capital and base on a column are possible. Polygonal columns formed from the compositions of the invention possess a width that is not more than four times its thickness. Columns formed from the compositions of the invention may be constructed such that they are solid, hollow (e.g., decorative columns), reinforcement filled, or any combination thereof. Columns can be short columns (i.e., columns where strength is governed by construction components and the geometry of its cross section) or slender columns (i.e., cross-sectional dimensions that are less than 5 times its length). The dimensions of the column may vary greatly depending on the intended use of the structure, e.g., from being less than a single story high, to several stories high or more, and having a corresponding width. Columns may vary in their mechanical and physical properties.

Properties such as compressive and flexural strengths may vary depending on the design and intended use of the column. For example, unreinforced concrete columns may possess flexural strengths that range from 2 to 20 MPa, including 5 to 15 MPa, such as 7 to 12 MPa and compressive strengths that range from 10 to 100 MPa, including 25 to 75 MPa, such as 50 MPa. Structurally reinforced concrete columns of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In some embodiments, columns may be composite, wherein it may act compositely with other structural units by the introduction of interfacial shear mechanisms. In other embodiments, columns may be non-composite, wherein it utilizes the properties of the basic column alone. In producing columns of the invention, the composition after combination with water may be poured into a column form or cast around a correlated steel reinforcing column structure (e.g., steel rebar). In some embodiments, the steel reinforcement is pre-tensioned prior to casting the composition around the steel framework. In other embodiments, columns of the invention may be cast with a steel reinforcing cage that is mechanically anchored to the concrete column. The columns of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction.

The composition is further allowed to set and is cured in an environment with a controlled temperature and humidity. In addition, the columns of the invention may include a variety of additional components, such as but not limited to, plasticizers, foaming agents, accelerators, retarders and air entrainment additives. Where desired, these additional components may include chemical admixtures such that the columns of the invention possess increased resistance to damage by biodegradation, frost, water, fire and corrosion.

Another building material formed from the compositions of the invention is a concrete slab. Concrete slabs are those building materials used in the construction of prefabricated foundations, floors and wall panels. In some instances, a concrete slab may be employed as a floor unit (e.g., hollow plank unit or double tee design). In other instances, a precast concrete slab may be a shallow precast plank used as a foundation for in-situ concrete formwork. Wall panels are, in a broad sense, vertical load-bearing members of a building that are polygonal and possess a width that is more than four times its thickness. Precast concrete foundation, floors and wall panels may vary considerably in dimension depending on the intended use of the precast concrete slab (e.g., one or two storey building). As such, precast concrete slabs may have dimensions which range from 1 to 10 m in length or longer, including 3 to 8 m, such as 5 to 6 m; height that ranges from 1 to 10 m or taller, including 4 to 10 m, such as 4 to 5 m; and a thickness that may range from 0.005 to 0.25 m or thicker, including 0.1 to 0.2 m such as 0.1 to 0.15 m. Formed building materials such as slabs, and structures made therefrom, may be thicker than corresponding structures that lack components of the composition of the invention. In addition, structures made from amorphous building materials formed from the composition of the invention may be thicker than corresponding structures that are not formed from the composition of the invention.

In some embodiments, thickness of formed building materials or related structures is increased by 1.5 fold or more, 2-fold or more, or 5-fold or more. Concrete slabs formed from the compositions of the invention may vary in their mechanical and physical properties depending on their intended use. For example, a prefabricated slab that is employed in a floor unit may possess larger flexural strengths and lesser compressive strengths than a slab that is employed as a load-bearing wall. For example, unreinforced concrete slabs may possess flexural strengths that vary, ranging from 2 to 25 MPa, including 5 to 15 MPa, such as 7 to 12 MPa and compressive strengths that range from 10 to 100 MPa, including 25 to 75 MPa, such as 50 MPa. Structurally reinforced concrete slabs of the invention may possess considerably larger flexural strengths, ranging from 15 to 50 MPa, including 20 to 40 MPa, such as 25 to 35 MPa and compressive strengths that range from 25 to 200 MPa, including 50 to 150 MPa, such as 75 to 125 MPa. In producing concrete slabs, the composition after combination with water may be poured into a slab mold or cast around a correlated steel reinforcing structure (e.g., steel rebar). In some embodiments, the steel reinforcement is pretensioned prior to casting the composition around the steel framework. In other embodiments, slabs of the invention may be cast with a steel reinforcing cage that is mechanically anchored to the concrete slab. In some embodiments, the concrete slabs of the invention may improve its structural capacity by casting a second, supportive concrete layer that is mechanically anchored to the previously precast concrete slab. The slabs formed from the compositions of the invention may also employ additional structural support components such as, but not limited to, cables, wires and mesh composed of steel, ductile iron, polymeric fibers, aluminum or plastic. The structural support components may be employed parallel, perpendicular, or at some other angle to the carried load. The molded or casted composition may be further compacted by roller compaction, hydraulic pressure, vibrational compaction, or resonant shock compaction. The composition is further allowed to set and is cured in an environment with a controlled temperature and humidity. In addition, the slabs of the invention may include a variety of further components, such as but not limited to, plasticizers, foaming agents, accelerators, retarders and air entrainment additives. Where desired, the further components may include chemical admixtures such that the slabs formed from the compositions of the invention possess increased resistance to damage by bio-degradation, frost, water, fire and corrosion.

Another building material formed from the compositions of the invention is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc. Acoustic barriers formed from the compositions of the invention may widely vary in size and shape. Acoustic barriers may be polygonal, circular, or any other shape depending on its intended use. Acoustic barrier may be employed in the attenuation of sound from highways, roadways, bridges, industrial facilities, power plants, loading docks, public transportation stations, military facilities, gun ranges, housing complexes, entertainment venues (e.g., stadiums, concert halls) and the like. Acoustic barriers may also be employed for sound insulation for the interior of homes, music studios, movie theaters, classrooms, etc. The acoustic barriers formed from the compositions of the invention may have dimensions that vary greatly depending on its intended use, ranging from 0.5 to 10 m in length or longer, e.g., 5 m and 0.1 to 10 m in height/width or wider, e.g., 5 m and a thickness ranging from 10 to 100 cm, or thicker e.g., 25 to 50 cm, including 40 cm. Where desired, the acoustic barrier may be employed with various coatings or liners (e.g., polymeric), and may be configured for easy joining with each other or pillars separating additional acoustic barriers to produce long acoustic barrier structures made up of multiple acoustic barriers of the invention. In some embodiments, acoustic barriers formed from the compositions of the invention may employ sound absorptive material (e.g., wood shavings, textile fibers, glass wool, rock wool, polymeric foam, vermiculite, etc.) in addition to a structurally reinforcing framework. In some embodiments, acoustic barriers may be used as noise-reduction barriers in an outdoor environment (e.g., along a highway, near an airport, etc.) and may be employed with structural support components (e.g., columns, posts, beams, etc.). In producing acoustic barriers of the invention, the composition of the invention after combination with water is poured into a mold to form the desired acoustic barrier shape and size. Also the composition may be poured out into a sheet mold or a roller may be used to form sheets of a desired thickness. The shaped composition may be further compacted by roller compaction, hydraulic pressure, vibrational compaction, or resonant shock compaction. The sheets are then cut to the desired dimensions of the acoustic barriers. In some instances, the resultant composition may also be foamed using mechanically or chemically introduced gases prior to being shaped or while the composition is setting in order to form a lightweight acoustic panel structure. The shaped composition is further allowed to set and is cured in an environment with a controlled temperature and humidity. In addition, the acoustic barriers of the invention may include a variety of further components, such as but not limited to, plasticizers, foaming agents, accelerators, retarders and air entrainment additives. Where desired, the further components may include chemical admixtures such that they possess increased resistance to damage by bio-degradation, frost, water, fire and corrosion. In some embodiments, the acoustic barriers of the invention may employ structural support components such as, but not limited to, cables, wires and mesh composed of steel, ductile iron, polymeric fibers, aluminum or plastic.

Another building material formed from the compositions of the invention is an insulation material, which refers to a material used to attenuate or inhibit the conduction of heat. Insulation may also include those materials that reduce or inhibit radiant transmission of heat. Insulation material may consist of one or more of the following constituents: a cementitious forming material, a dispersing agent, an air entraining agent, inert densifying particulate, a mixture of ionic and non-ionic surfactants, plasticizers, accelerators, lightweight aggregate, organic and inorganic binding agents and glass particles. In certain embodiments of the invention, an amount of cementitious forming material may be replaced by the above described composition of the invention. Binding compositions for the insulation material of the invention include a component selected from the group consisting of carbides, Gypsum powder, Blakite, nitrides, calcium carbonate, oxides, titanates, sulfides, zinc selenide, zinc telluride, inorganic siloxane compound and their mixtures thereof. In certain embodiments of the invention, an amount of the binding composition may be replaced by the above described composition of the invention. Where desired, insulation material of the invention may also be prepared using a chemical admixture or any other convenient protocol such that they are resistant to damage by termites, insects, bacteria, fungus. Etc.

Insulation materials of the invention may be prepared using any convenient protocol such that they are freeze/thaw, rain and fire resistant. Insulation material of the invention may be prepared in accordance with traditional manufacturing protocols for such materials, with the exception that the composition of the invention is employed. In producing the insulation materials of the invention, an amount of the composition of the invention may be combined with water and other components of the insulation material, which may include, but are not limited to a dispersing agent, an air entraining agent, inert densifying particulate, a mixture of ionic and non-ionic surfactants, plasticizers, accelerators, lightweight aggregate, organic and inorganic binding agents and glass particles. The resultant insulation material may then be molded into the desired shape (e.g., wall panel) or poured into the void space of concrete masonry units, flooring units, roof decks or cast around pipes, conduits and basins.

In some embodiments, the formed building material such as pre-cast concrete products include, but are not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

In one aspect, there are provided ceramic compositions comprising the cementitious composition of the invention. Conventionally ceramic material is prepared by action of heat and subsequent cooling of an inorganic solid. Ceramic material typically is a strong material however, it is brittle in nature. The ceramic composition of the invention does not require high heating and cooling steps. Further, the ceramic composition of the invention is strong and non-brittle. The ceramic composition of the invention is also strong due to strong bond formed after cementation. The ceramic composition of the invention may be used to make formed building materials such as tiles or materials that mimic synthetic marble or limestone. The ceramic composition of the invention may be coated with materials such as epoxy coating to provide glossy and smooth surface.

In some embodiments, the composition is used for non-cementitious products such as, but not limited to, paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such use of calcium carbonate containing compositions in non-cementitious products is described in U.S. Pat. No. 7,829,053, issued Nov. 9, 2010, which is incorporated herein by reference in its entirety.

D. Systems

In some embodiments, the invention provides systems configured to perform the methods of the invention. In some embodiments, there is provide a system, comprising a cement producing station operably connected to carbon dioxide from a carbon dioxide source, alkaline solution from an alkali source, and calcium sulfate from a calcium sulfate source and configured to make a composition comprising a metastable component selected from the group consisting of vaterite, amorphous calcium carbonate, and combination thereof. In some embodiments, the cement producing station is configured to produce the cementitious composition using carbon dioxide from a carbon dioxide source, alkaline solution from an alkali source, and divalent cations from a divalent cation source. Such sources have been described herein. In some embodiments, the system further includes an alkali source operably connected to the cement producing station configured to electrochemically produce the alkaline solution.

In some embodiments, a system containing a cement producing station, such as system in FIG. 1 is provided for processing carbon dioxide, utilizing calcium sulfate as described herein, wherein the cement producing station comprises a processor configured for carrying out the precipitation 20 using the carbon dioxide source, alkaline solution source, and gypsum source, and a treatment system configured for carrying out the separation 40, washing 50, drying 60, and/or refining 70 wherein the system may further comprise an electrochemical system operably connected for recirculating at least a portion of treatment system supernatant.

The processor of such carbon-dioxide processing systems may comprise a contactor such as a gas-liquid or a gas-liquid-solid contactor, wherein the contactor is configured for charging an aqueous solution or slurry with carbon dioxide to produce a carbon dioxide-charged solution, which may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates.

The processor of carbon dioxide-processing systems of the invention may be configured to receive treatment system supernatant or an electrochemical system stream in the contactor (e.g., gas-liquid contactor, gas-liquid-solid contactor), the reactor, a combination of the contactor and the reactor, or in any other unit or combination of units in the processor. The treatment system of such carbon dioxide-processing systems may comprise a dewatering system and/or a filtration system. As such, the dewatering system, the filtration system, or a combination of the dewatering system and the filtration system may be configured to provide at least a portion of supernatant to the processor for processing carbon dioxide, to the electrochemical system, or both. The treatment system may also be configured to provide at least a portion of supernatant to a washing system configured to wash compositions of the invention, wherein the compositions comprise precipitation material (e.g., $CaCO_3$ optionally containing $MgCO_3$). In some embodiments, the carbon dioxide-processing system may be configured to provide at least a portion of the supernatant to a system (e.g., desalination plant) or process (e.g., desalination) external to the carbon-dioxide processing system. For example, a system of the invention may be operably connected to a desalination plant such that the system provides at least a portion of treatment system supernatant to the desalination plant for desalination.

In some embodiments, a system that includes a concrete producing station that is configured to accept the cementitious composition of the invention is provided. The cement producing station may be a mixing tank, pipe or a conduit. In such embodiments, the system accepts concrete from the concrete producing station and sand or aggregate from its source and produces a concrete composition suitable for structural building applications. In some embodiments, the system includes an aggregate source that is connected to the cement producing station. In some embodiments, the aggregate source provides aggregate to the cement producing station in which the aggregate includes at least 80 wt % carbonate mineral and has a $\delta^{13}C$ value less than −10%.

The parasitic load of carbon dioxide-processing systems of the invention may be reduced by efficient use of other resources. In some embodiments, the parasitic load of carbon dioxide-processing systems of the invention may be reduced by efficient use of heat from an industrial source. In some embodiments, for example, heat from the industrial source of carbon dioxide (e.g., flue gas heat from a coal-fired power plant) may be utilized for drying a composition comprising precipitation material comprising carbonates, bicarbonates, or carbonates and bicarbonates. In such embodiments, a spray dryer may be used for spray drying the composition. For example, low-grade (e.g., 150-200° C.) waste heat may be utilized by means of a heat exchanger to evaporatively spray dry the composition comprising the precipitation material. In addition, utilizing heat from the industrial source of carbon dioxide for drying compositions of the invention allows for simultaneous cooling of the industrial source of carbon dioxide (e.g., flue gas from a coal-fired power plant), which enhances dissolution of carbon dioxide, a process which is inversely related to temperature. In some embodiments, the parasitic load of carbon dioxide-processing systems of the invention may be further reduced by efficient use of pressure. For example, in some embodiments, carbon dioxide-processing systems of the invention are configured with an energy recovery system. Such energy recovery systems are known, for example, in the art of desalination and operate by means of pressure exchange. In some embodiments, the overall parasitic load of the carbon dioxide-processing system may be less than 99.9%, 90%, 80%, 70%, 60%, 50%, 40%, 30%, 20%, 15%, 10%, 5%, or 3% when capturing and processing 70-90% of the carbon dioxide emitted from an industrial plant (e.g., coal-fired power plant). For example, in some embodiments, the overall parasitic load of the carbon dioxide-processing system may be less than 30%, such as less than 20%, including less than 15%, for example, less than 10%, less than 5%, or less than 3% when capturing and processing 70-90% of the carbon dioxide emitted from an industrial plant (e.g., coal-fired power plant). As such, carbon dioxide-processing systems of the invention configured for recirculation, heat exchange, and/or pressure exchange may reduce the parasitic load on power-providing industrial plants while maintaining carbon dioxide processing capacity.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Various modifications of the invention in addition to those described herein will become apparent to those skilled in the art from the foregoing description and accompanying figures. Such modifications fall within the scope of the appended claims. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLE

Example 1

In this experiment, gypsum from mining or FGD gypsum is ground into a fine powder (<100 microns) and combined with $Na_2CO_3$ or $Na_2CO_3/NaHCO_3$ solution or slurry or dry powder. In this process, raw flue gas from a natural gas power plant containing $CO_2$ was contacted with an aqueous alkaline solution (sodium hydroxide/sodium carbonate solution) in an absorber, forming a sodium carbonated solution. The gypsum powder was added to a $Na_2CO_3$ saturated solution (w/s=10:1), when the precipitate of calcium carbonate was formed that had 97% vaterite and 3% calcite product after 2 hours. No gypsum was detected in the product.

As illustrated in FIG. 7, additional experiments with lower water to solid ratio (w/s=0.3) with $Na_2CO_3$ added as a slurry/powder to the gypsum resulted in a quick setting cementitious material with a high compressive strength of 2900 psi after 1 day. SEM images showed a dense, tightly packed $CaCO_3$/$Na_2SO_4$ groundmass with interlocked 1-4 micron particles. The material had high strength and may be used in drywall and other building materials.

Example 2

The raw flue gas from a natural gas power plant containing $CO_2$ was contacted with an aqueous alkaline solution (sodium hydroxide/sodium carbonate solution) in an absorber, forming a sodium carbonated solution. Gypsum was added to a 1.4 M $Na_2CO_3$ solution, such that the molar ratio of gypsum to $Na_2CO_3$ was 0.95. The suspension was mixed with an overhead mixer at 2500 rpm for 15 minutes, before vacuum filtering to isolate the solids. The pH profile over time was between 10.5-7.5. The resulting solids were oven dried. XRD analysis of the powder indicated 97.1% vaterite and 2.9% calcite. A 15 g of this powder was rinsed in a buchner funnel with 100 mL of 1.4 M $Na_2CO_3$, and then 100 mL of 1.4 M $MgCl_2$, and then 100 mL of deionized water. The resultant filter cake was then oven dried. The dried powder was mixed with a 100 mM $MgCl_2$ solution to form a paste. After 1 day of curing, the solids were determined to be ~10-20% aragonite. After 2 days of curing, the solids were determined to be ~80-100% aragonite.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of making a composition, comprising:
   a) contacting an industrial waste gas stream comprising carbon dioxide with an alkaline solution to form a carbon dioxide charged water; and
   b) adding calcium sulfate to the carbon dioxide charged water to form a composition comprising a metastable component selected from the group consisting of vaterite, amorphous calcium carbonate, and combination thereof wherein the calcium sulfate is selected from the group consisting of anhydrous calcium sulfate, calcium sulfate hemihydrate, calcium sulfate dihydrate, and combinations thereof.

2. The method of claim 1, further comprising removing water, sodium sulfate, or both from the composition.

3. The method of claim 1, wherein the contacting of the carbon dioxide charged water with the calcium sulfate is under one or more precipitation conditions that favor the formation of the composition comprising the metastable component selected from the group consisting of vaterite, amorphous calcium carbonate, and combination thereof wherein the one or more precipitation conditions are selected from the group consisting of temperature, pH, residence time, proton removing agent, additive, ion ratio, rate of precipitation, mixing rate, form of agitation, presence of seed crystal, catalyst, membrane, or substrate, separation, drying, refining, and combinations thereof.

4. The method of claim 3, wherein the precipitation conditions favor the formation of more than 50 wt % vaterite in the composition.

5. The method of claim 1, further comprising converting the vaterite to aragonite in presence of water.

6. The method of claim 1, wherein the calcium sulfate is a powder.

7. The method of claim 1, further comprising obtaining the calcium sulfate from mines or quarries, flue gas desulfurization, desalination, recycled building materials, fly ash, basalt, or a combination of sources thereof.

8. The method of claim 1, wherein the calcium sulfate comprises particles less than about 150 microns.

9. The method of claim 1, comprising forming the composition with $\delta^{13}C$ of less than −12‰.

10. The method of claim 1, wherein the composition further comprises sodium sulfate.

11. The method of claim 10, further comprising removing the sodium sulfate from the composition and subjecting the sodium sulfate to electrochemical process to produce sulfuric acid.

12. The method of claim 1, further comprising combining the composition with water when the composition sets and hardens with a compressive strength of at least 14 MPa after 1 day, 7 days or 28 days.

13. The method of claim 1, wherein the composition is a cementitious composition.

14. The method of claim 1, wherein the composition is used for making building materials.

15. The method of claim 1, wherein the carbon dioxide charged water comprises carbonate, bicarbonate, or combination thereof.

16. The method of claim 1, further comprising mixing the composition with water and pouring the composition in a mold to form a formed building material.

* * * * *

UNITED STATES PATENT AND TRADEMARK OFFICE
CERTIFICATE OF CORRECTION

Page 1 of 1

PATENT NO. : 8,691,175 B2
APPLICATION NO. : 13/566213
DATED : April 8, 2014
INVENTOR(S) : Treavor Kendall et al.

It is certified that error appears in the above-identified patent and that said Letters Patent is hereby corrected as shown below:

Title Page, Item (75) Inventors:

Change "Teavor" to --Treavor--

Signed and Sealed this
Fourth Day of August, 2015

Michelle K. Lee
*Director of the United States Patent and Trademark Office*